US011625444B2

(12) United States Patent
Minter et al.

(10) Patent No.: US 11,625,444 B2
(45) Date of Patent: Apr. 11, 2023

(54) CURATED RESULT FINDER

(71) Applicants: Jeffrey David Minter, Littleton, CO (US); Albert Steven Baldocchi, San Francisco, CA (US); David Dupuy Minter, Littleton, CO (US); Jeffrey Paul Anderson, Carlsbad, CA (US)

(72) Inventors: Jeffrey David Minter, Littleton, CO (US); Albert Steven Baldocchi, San Francisco, CA (US); David Dupuy Minter, Littleton, CO (US); Jeffrey Paul Anderson, Carlsbad, CA (US)

( * ) Notice: Subject to any disclaimer, the term of this patent is extended or adjusted under 35 U.S.C. 154(b) by 0 days.

(21) Appl. No.: 17/816,400

(22) Filed: Jul. 30, 2022

(65) Prior Publication Data

US 2023/0044745 A1 Feb. 9, 2023

Related U.S. Application Data

(60) Provisional application No. 63/300,370, filed on Jan. 18, 2022.

(51) Int. Cl.
| | |
|---|---|
| *G06F 16/9535* | (2019.01) |
| *G06F 16/951* | (2019.01) |
| *G06F 16/9536* | (2019.01) |
| *G06F 16/9537* | (2019.01) |

(52) U.S. Cl.
CPC ........ *G06F 16/9535* (2019.01); *G06F 16/951* (2019.01); *G06F 16/9536* (2019.01); *G06F 16/9537* (2019.01)

(58) Field of Classification Search
CPC .............. G06F 16/9535; G06F 16/951; G06F 16/9536; G06F 16/9537
See application file for complete search history.

(56) References Cited

U.S. PATENT DOCUMENTS

| | | | |
|---|---|---|---|
| 6,381,603 B1 * | 4/2002 | Chan | G06F 16/9537 |
| | | | 707/999.005 |
| 6,661,432 B1 | 12/2003 | McBrearty et al. | |
| 7,200,714 B2 | 4/2007 | Ben-Haim et al. | |
| 7,542,996 B2 | 6/2009 | Fanning et al. | |
| 7,822,734 B2 | 10/2010 | Kumar | |
| 8,341,144 B2 | 12/2012 | Kumar | |
| 8,818,983 B1 | 8/2014 | Truong | |
| 9,594,838 B2 | 3/2017 | Wang et al. | |
| 10,163,058 B2 | 12/2018 | Nitz et al. | |
| 10,324,993 B2 | 6/2019 | Arrizabalaga et al. | |
| 11,042,591 B2 | 6/2021 | Panuganty | |
| 11,288,575 B2 | 3/2022 | Tomioka et al. | |
| 11,468,130 B2 | 10/2022 | Colquhoun et al. | |
| 2002/0143524 A1 | 10/2002 | O'Neil et al. | |
| 2006/0294083 A1 | 12/2006 | Benton et al. | |

(Continued)

*Primary Examiner* — Etienne P Leroux
(74) *Attorney, Agent, or Firm* — Thomas J. Lavan

(57) ABSTRACT

A method is provided. The method includes one or more of obtaining client device data including a plurality of facts from a client device, limiting the client device data according to selection criteria, comparing the limited client device data to categorized historical data, determining one or more closest matches between the limited client device data and the categorized historical data, selecting, on the client device, content of interest from the one or more closest matches, and incorporating the content of interest into the categorized historical data. Each fact includes an entity, an observation, and an object.

21 Claims, 20 Drawing Sheets

(56) References Cited

U.S. PATENT DOCUMENTS

| | | |
|---|---|---|
| 2008/0140637 A1 | 5/2008 | Kumar |
| 2008/0208808 A1 | 8/2008 | Sue et al. |
| 2011/0071999 A1 | 3/2011 | Kumar |
| 2012/0130975 A1* | 5/2012 | Piao .................... G06F 16/9537 707/706 |
| 2012/0203758 A1 | 8/2012 | Yu et al. |
| 2013/0201329 A1* | 8/2013 | Thornton ............. G06V 10/255 348/143 |
| 2014/0173406 A1* | 6/2014 | Robelin ................ G06F 40/171 715/224 |
| 2014/0279995 A1 | 9/2014 | Wang et al. |
| 2015/0213371 A1 | 7/2015 | Nitz et al. |
| 2015/0363214 A1* | 12/2015 | Du ...................... G06F 11/3664 703/23 |
| 2016/0246891 A1* | 8/2016 | Accardo ............... G06F 16/284 |
| 2018/0025082 A1* | 1/2018 | Harik ................... G06F 16/951 707/738 |
| 2018/0260626 A1* | 9/2018 | Pestun ................. G08G 5/0052 |
| 2018/0349963 A1 | 12/2018 | Lautenberg et al. |
| 2019/0012393 A1* | 1/2019 | Cohen ................. G06F 16/9535 |
| 2020/0257921 A1* | 8/2020 | Viswanathan ....... G06V 10/443 |
| 2021/0377693 A1* | 12/2021 | Bouba .................... H04W 4/12 |
| 2022/0086122 A1* | 3/2022 | Therani ................ H04L 61/103 |
| 2022/0207033 A1 | 6/2022 | Radu et al. |
| 2022/0365993 A1* | 11/2022 | Voisin ................ G06F 16/9535 |

* cited by examiner

*Fig. 1 Curated Results System*
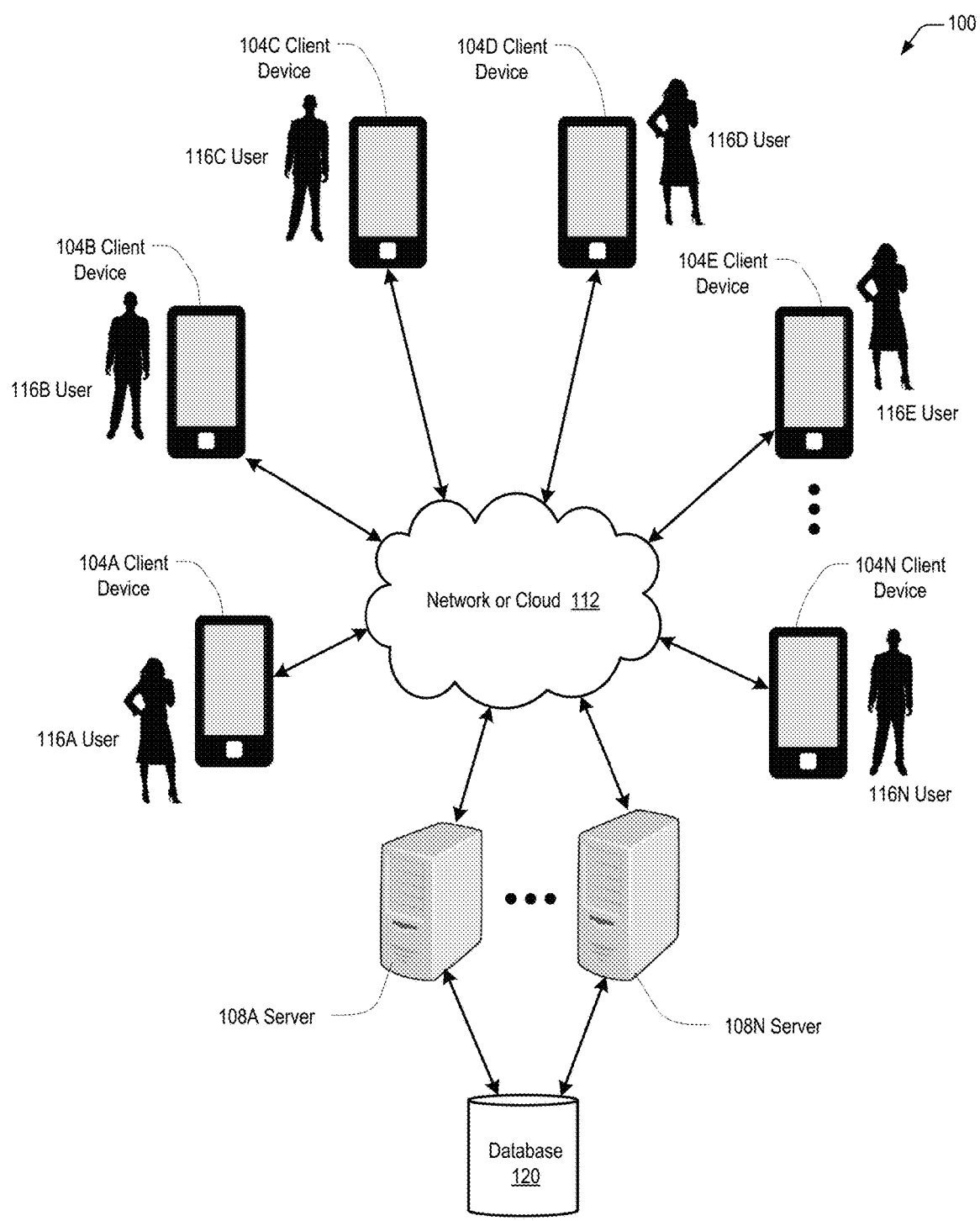

Fig. 2 Client Device
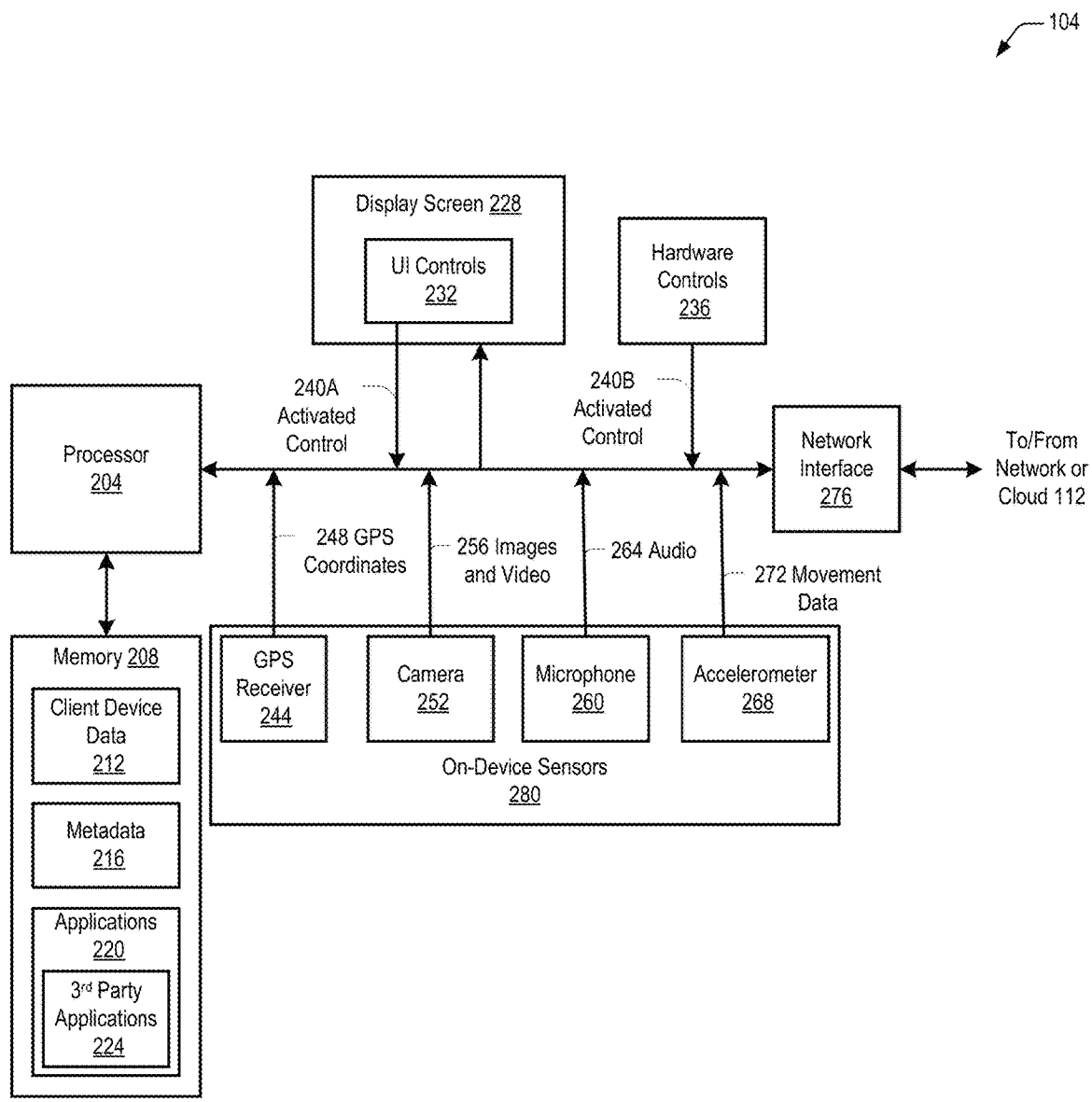

Fig. 3 Server
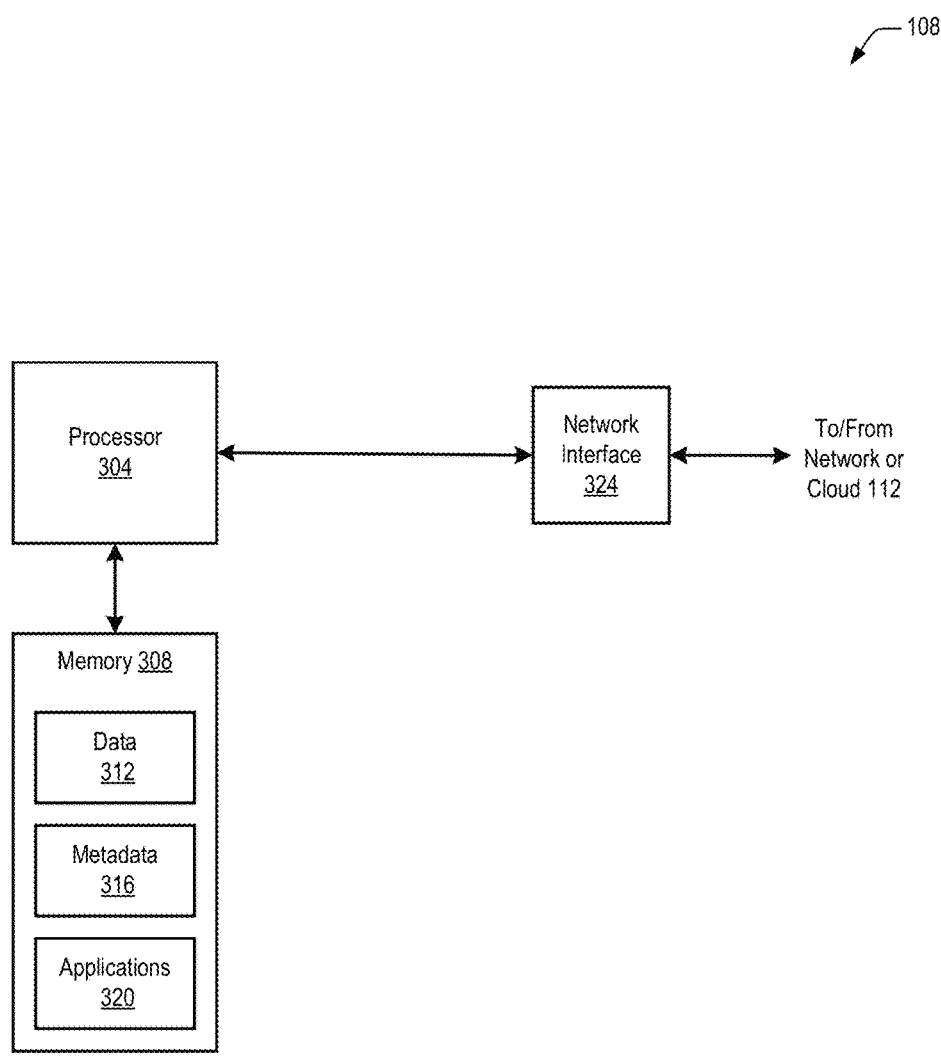

*Fig. 4A   Client Device and Server Intercommunication Diagram*
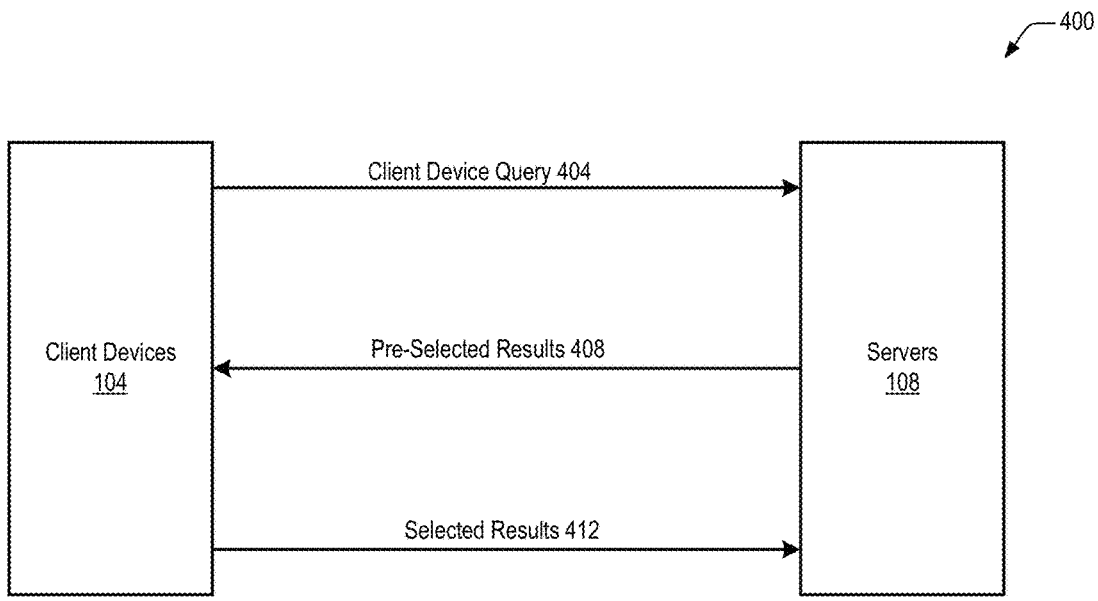
*Fig. 4B   Relationship of Client Device Query Example and Observation Conclusion Language (OCL)*
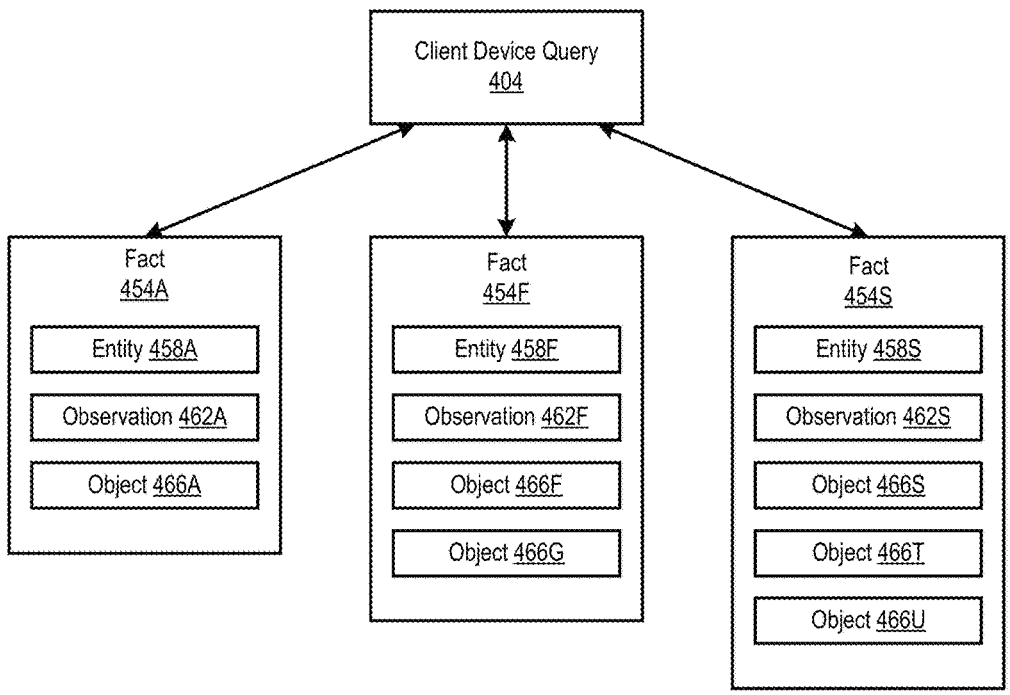

*Fig. 5A   Flow Diagram For Independent Client Device Queries*
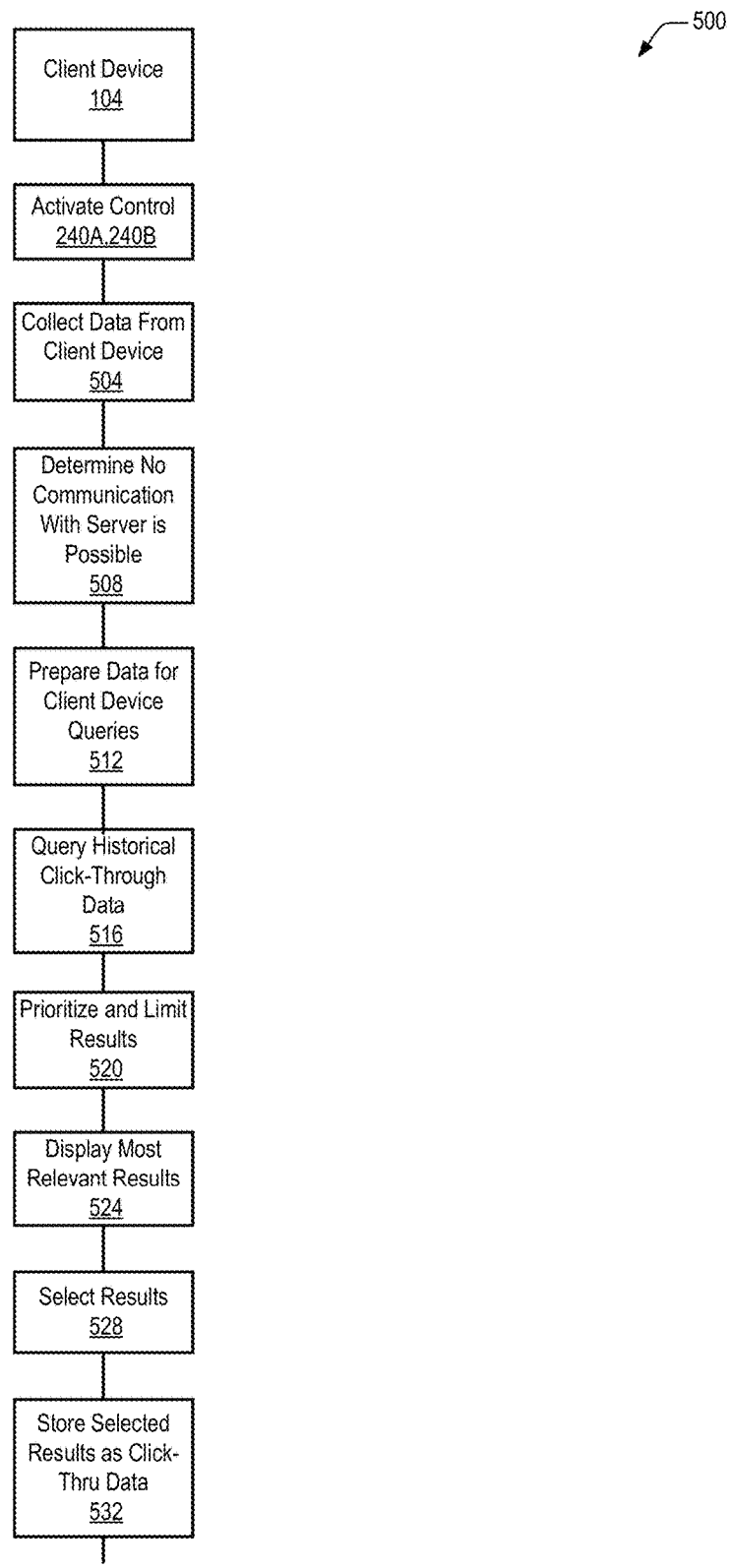

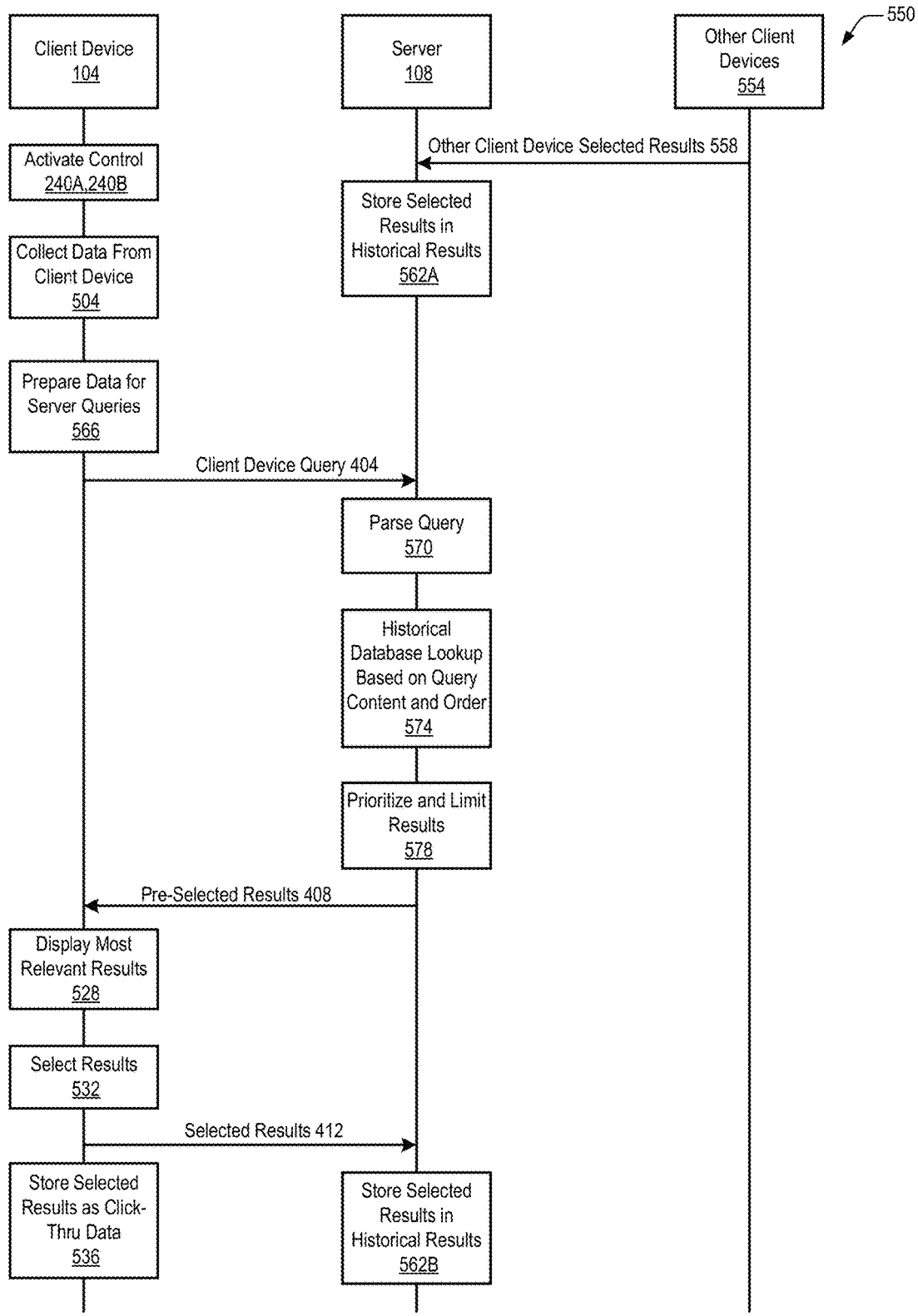

Fig. 6A  Flow Diagram For Preparing Data For Client Device Queries
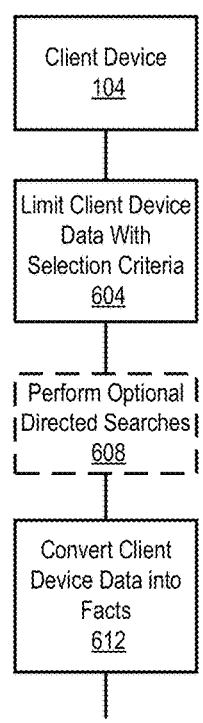

*Fig. 6B Flow Diagram For Preparing Data for Server Queries*
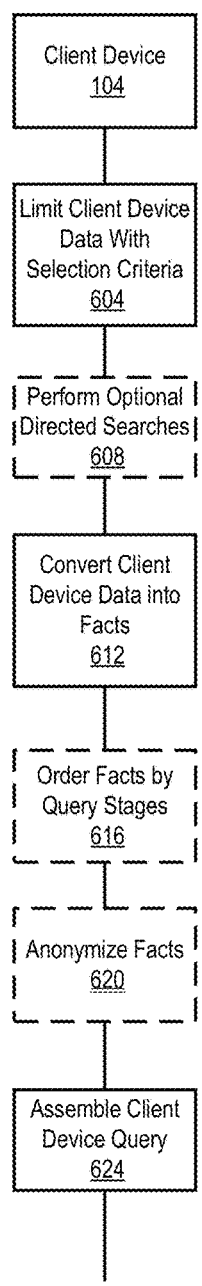

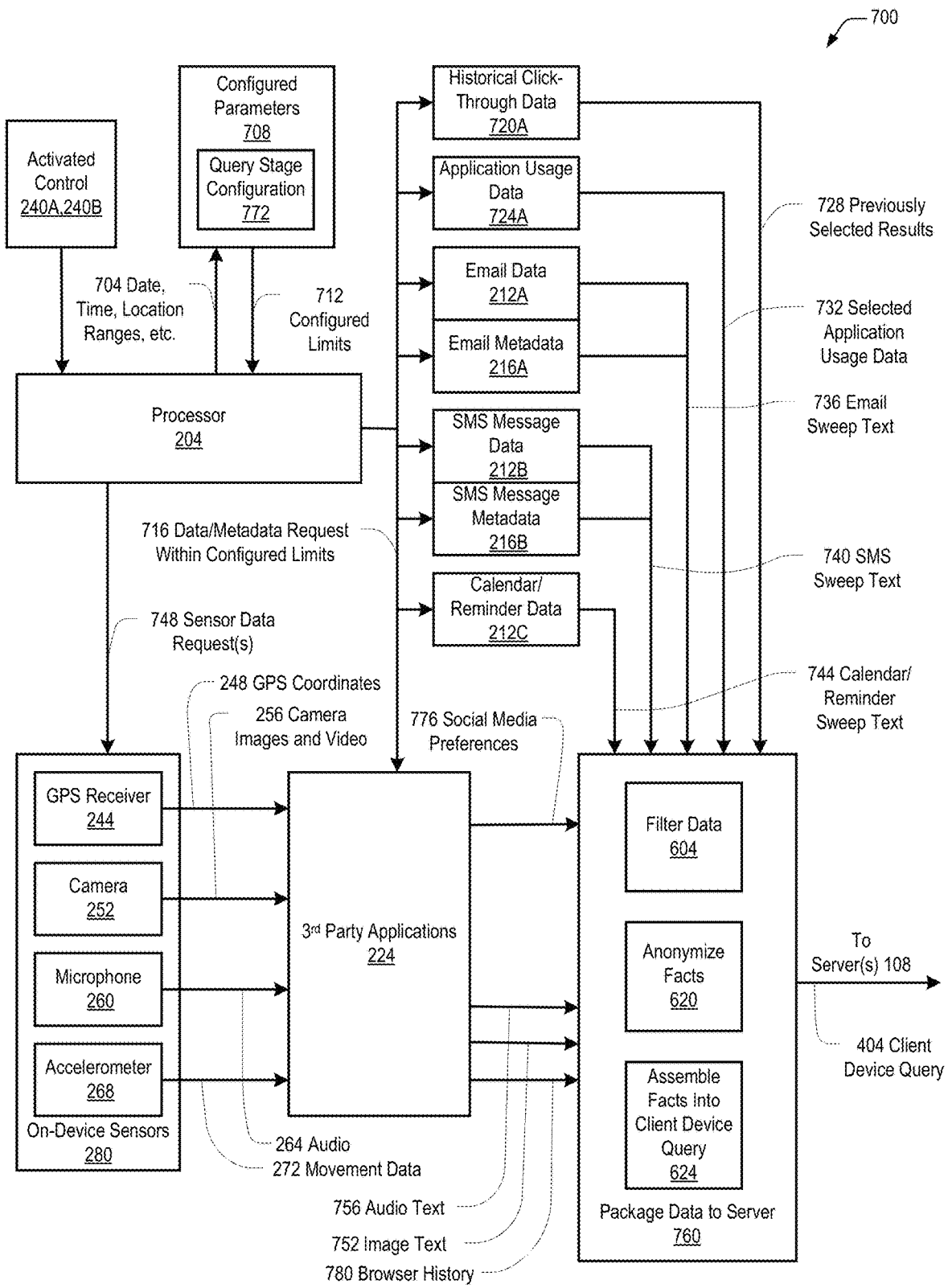
Fig. 7 Client Device Pre-Server Actions

Fig. 8  Client Device Query Content

| Content Item 804 | Query Stage Used 808 |
|---|---|
| User/Client Identity 810 | None, 1-N |
| Client Device Identity/IMEI Data 812 | None, 1-N |
| Date 814 | None, 1-N |
| Time of Day 816 | None, 1-N |
| Current Location 818 | None, 1-N |
| Trajectory 820 | None, 1-N |
| Configured Limits 712 | None, 1-N |
| Selected Application Usage Data 732 | None, 1-N |
| Calendar/Reminder Sweep Text 744 | None, 1-N |
| Email Sweep Text 736 | None, 1-N |
| SMS Sweep Text 740 | None, 1-N |
| Movement Data 272 | None, 1-N |
| Image Text 752 | None, 1-N |
| Audio Text 756 | None, 1-N |
| Previously Selected Results 728 | None, 1-N |
| Social Media Preferences 776 | None, 1-N |
| Browser History 780 | None, 1-N |
| User Profile 822 | None, 1-N |
| Near-Field Communication (NFC) Data 824 | None, 1-N |
| Bluetooth Data 826 | None, 1-N |

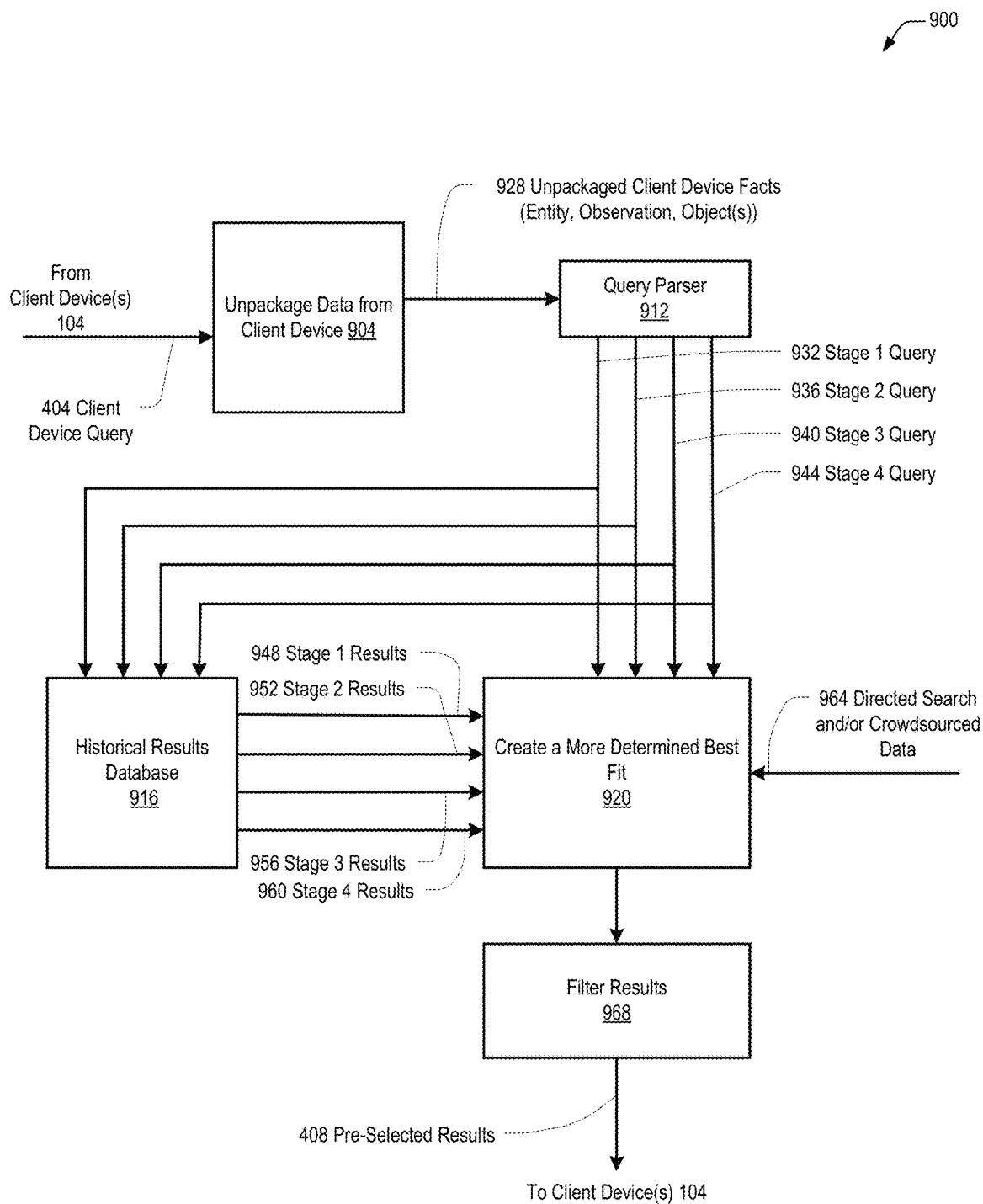
Fig. 9A   Server Processing Actions for Client Device Query

*Fig. 9B   Server Processing Actions for Client Device Query*
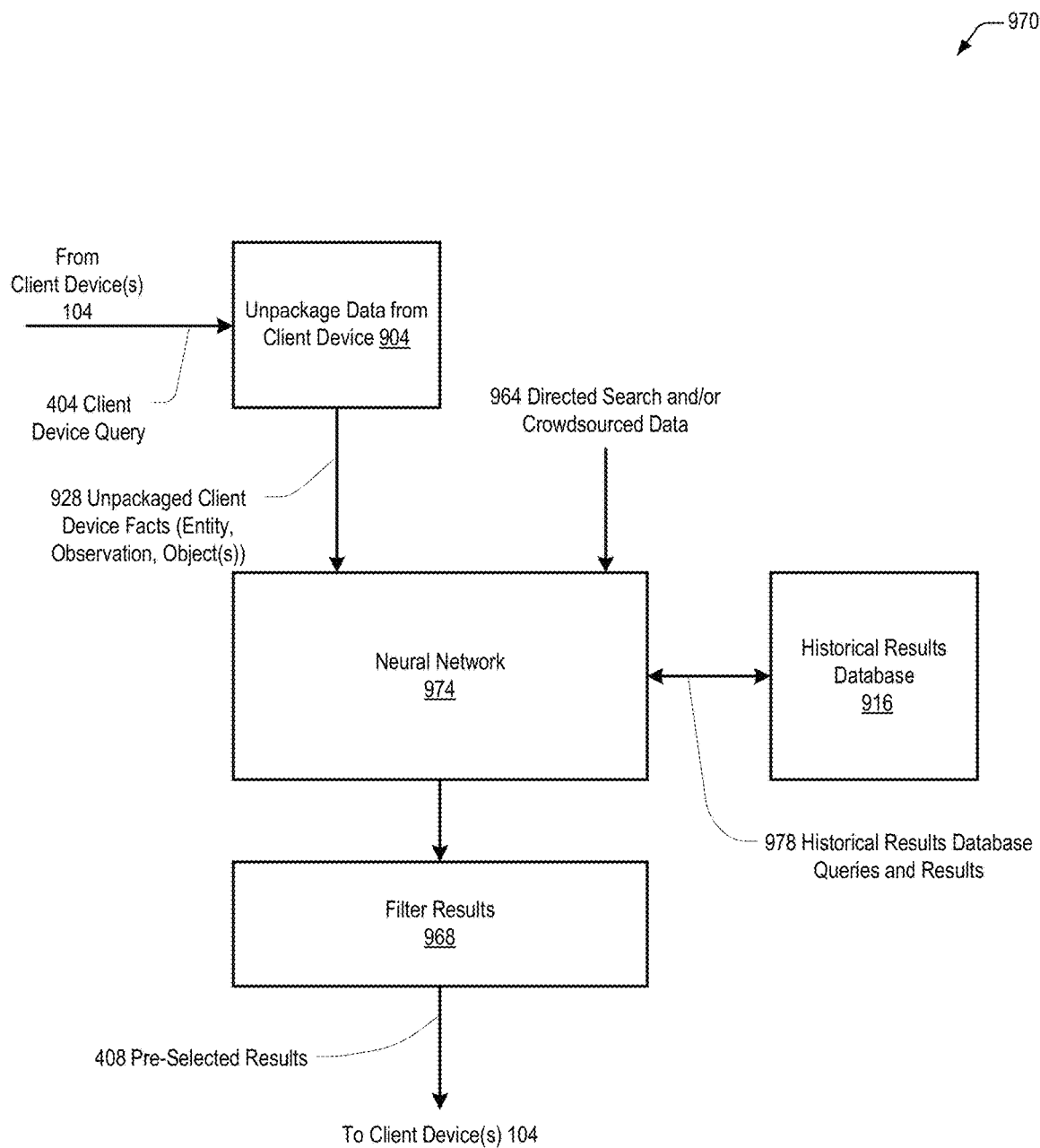

Fig. 10  Server More Determined Best Fit Process
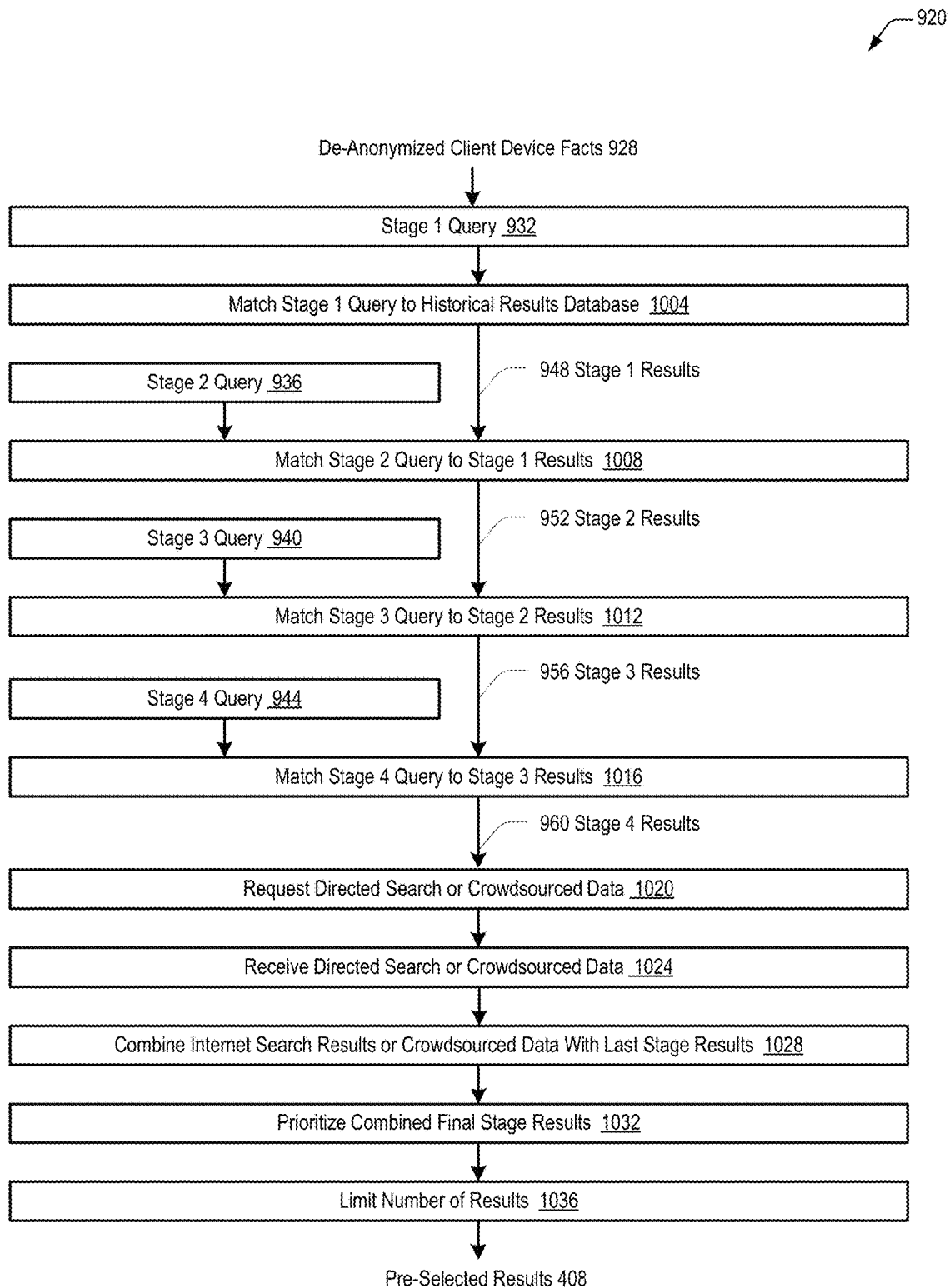

Fig. 11 Client Device Post-Server Actions
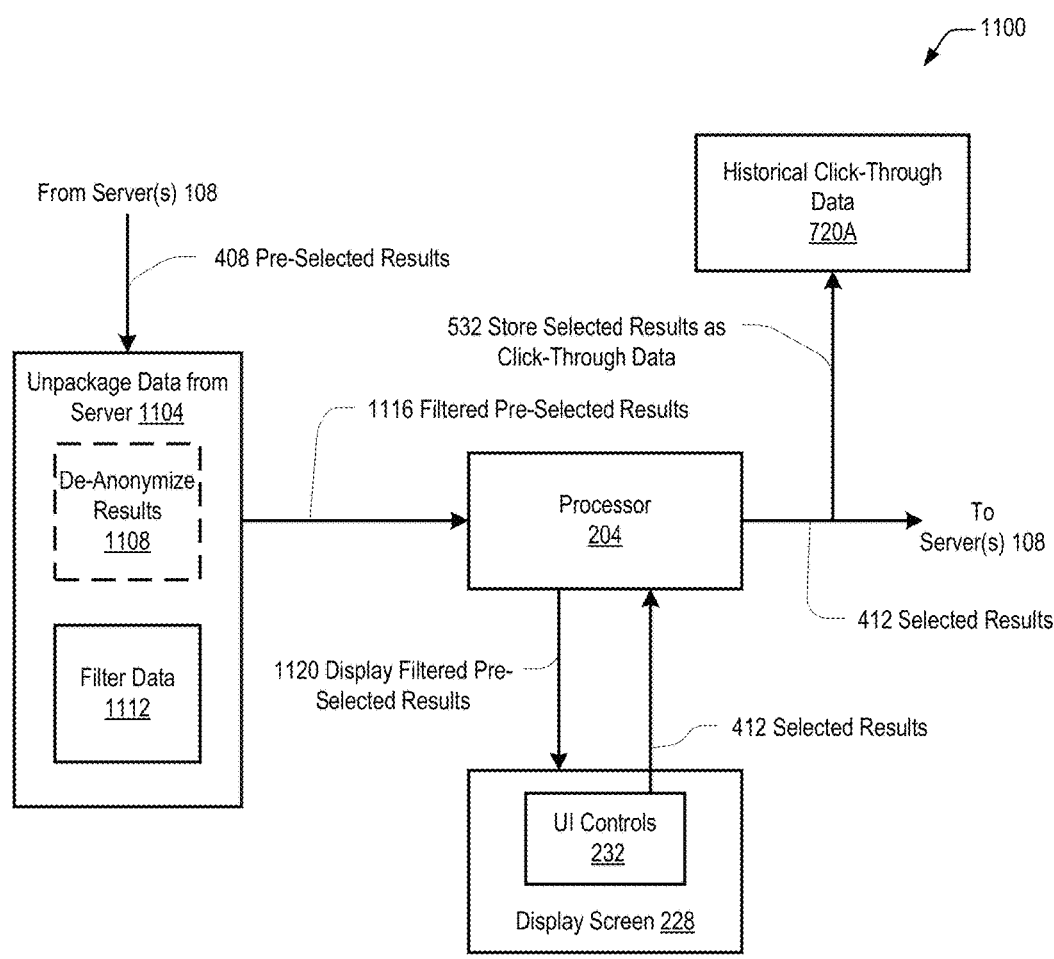

Fig. 12 Server Post-Query Actions
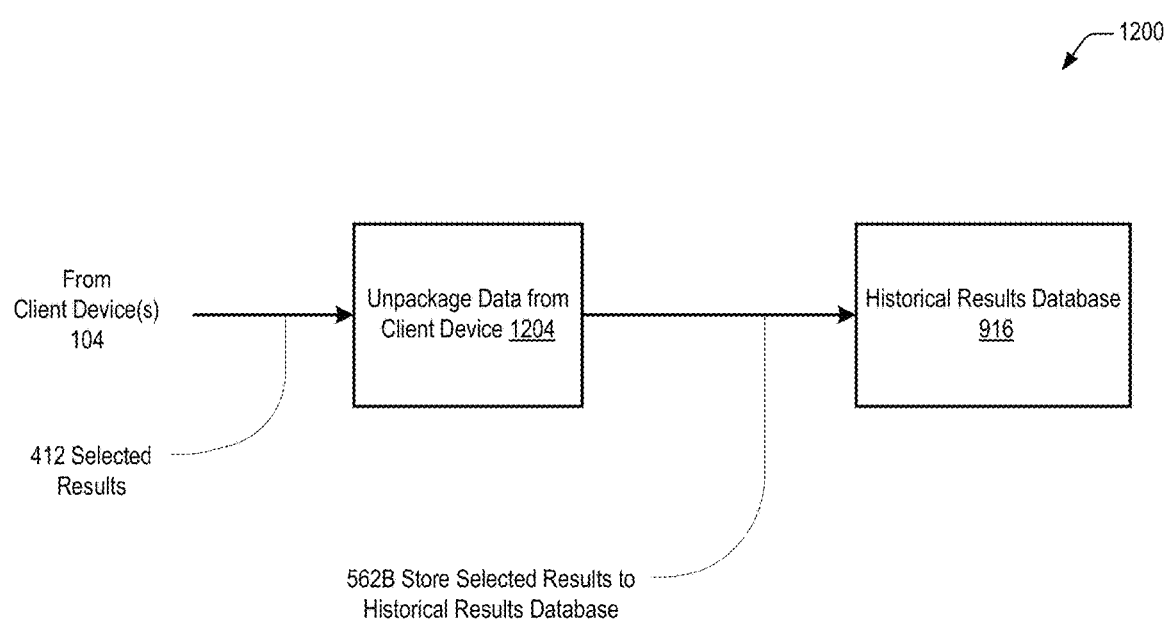

*Fig.13 Historical Results Database*

916

| Historical Data 1304 | User ID 1308 | Time of Day 1312 | Location 1316 | Trajectory 1320 | Count of # of Times Returned 1324 |
|---|---|---|---|---|---|
| Data Pattern #1 1304A | User A 1308A | a 1312A | i 1316A | s 1320A | 17 |
| Data Pattern #1 1304A | User C 1308C | c 1312C | j 1316B | t 1320B | 1 |
| Data Pattern #1 1304A | User L 1308L | d 1312D | k 1316C | | 2 |
| Data Pattern #1 1304A | User M 1308M | e 1312E | l 1316D | u 1320C | 8 |
| Data Pattern #1 1304A | User Q 1308Q | f 1312F | m 1316E | | 1 |
| Data Pattern #2 1304B | User B 1308B | a 1312A | i 1316A | s 1320A | 2 |
| Data Pattern #2 1304B | User M 1308M | g 1312G | l 1316D | t 1320D | 1 |
| Data Pattern #3 1304C | User A 1308A | a 1312A | o 1316F | u 1320E | 4 |
| Data Pattern #3 1304C | User L 1308L | h 1312H | p 1316G | | 1 |
| Data Pattern #3 1304C | User Z 1308Z | e 1312E | q 1316H | | 1 |
| Data Pattern #4 1304D | User B 1308Z | h 1312H | n 1316I | v 1320F | 1 |

Initial Match on Time of Day, Location, and Trajectory 1328

- Use Matched Historical Data for Stage 2 Query 1332

Query User ID/Client Device ID Matches Database User 1336

Query Current Location Matches Database Location 1340

- Use Historical Data for User/Location 1344

Query User ID/Client Device ID Matches Database User 1336

Query Current Location Does Not Match Database Location 1348

- Weight Favoring Common User ID/Client Device ID 1352

Query User ID/Client Device ID Does Not Match Database User 1356

Query Current Location Matches Database Location 1340

- Weight Favoring Common Location 1360

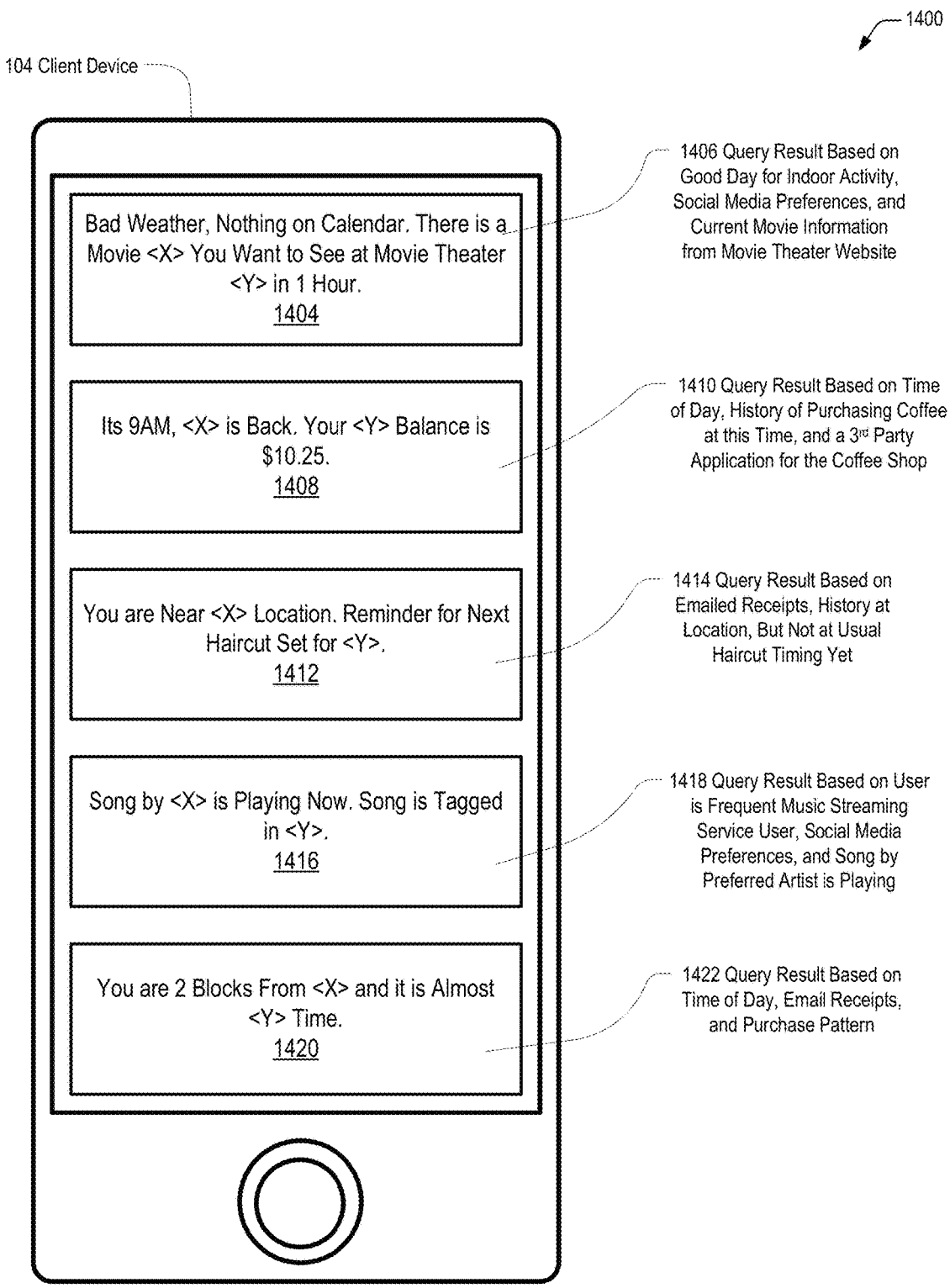
Fig. 14 Results Presentation Example

Fig. 15 Results Presentation Example
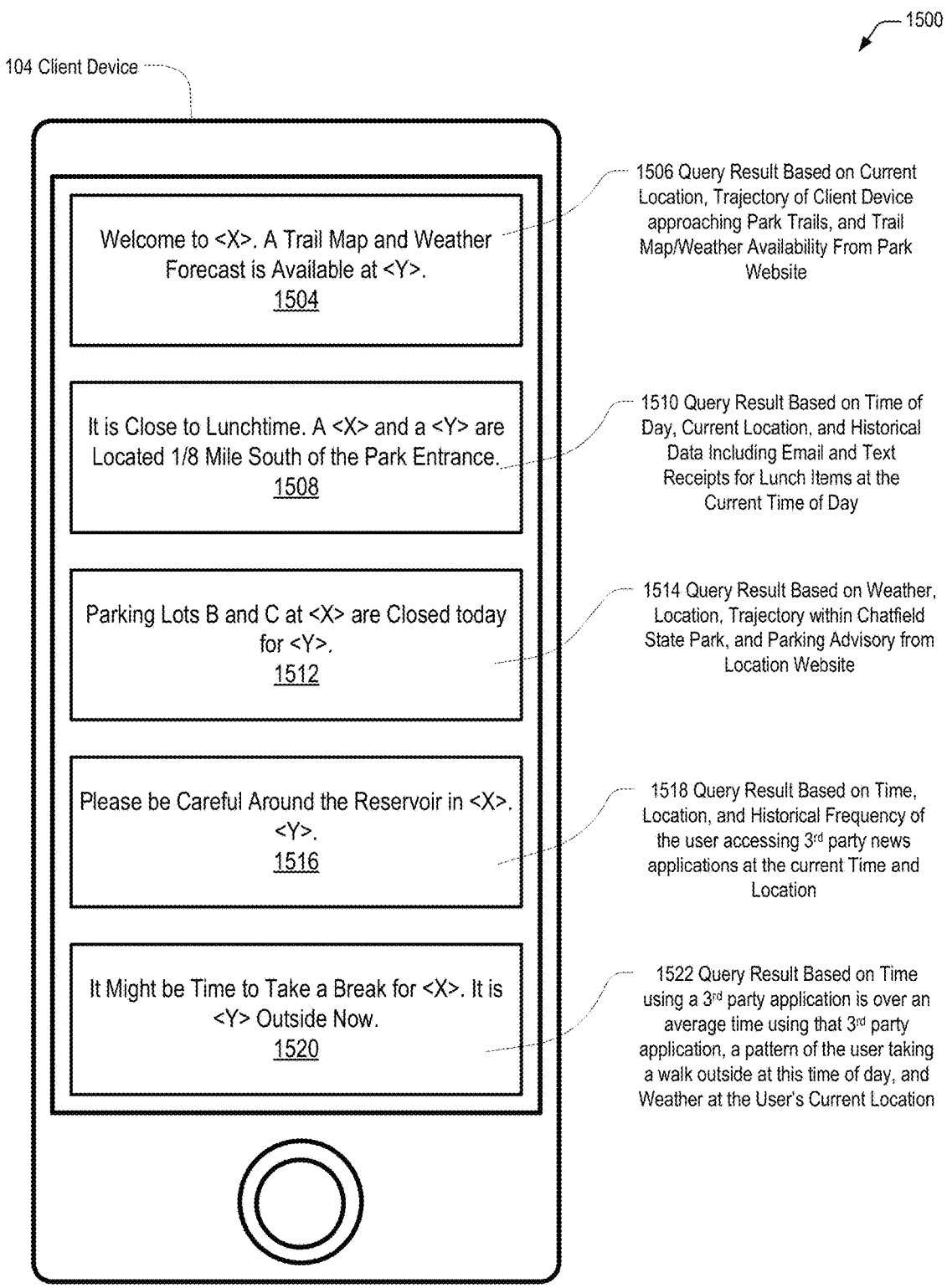

*Fig. 16   Results Presentation Example*
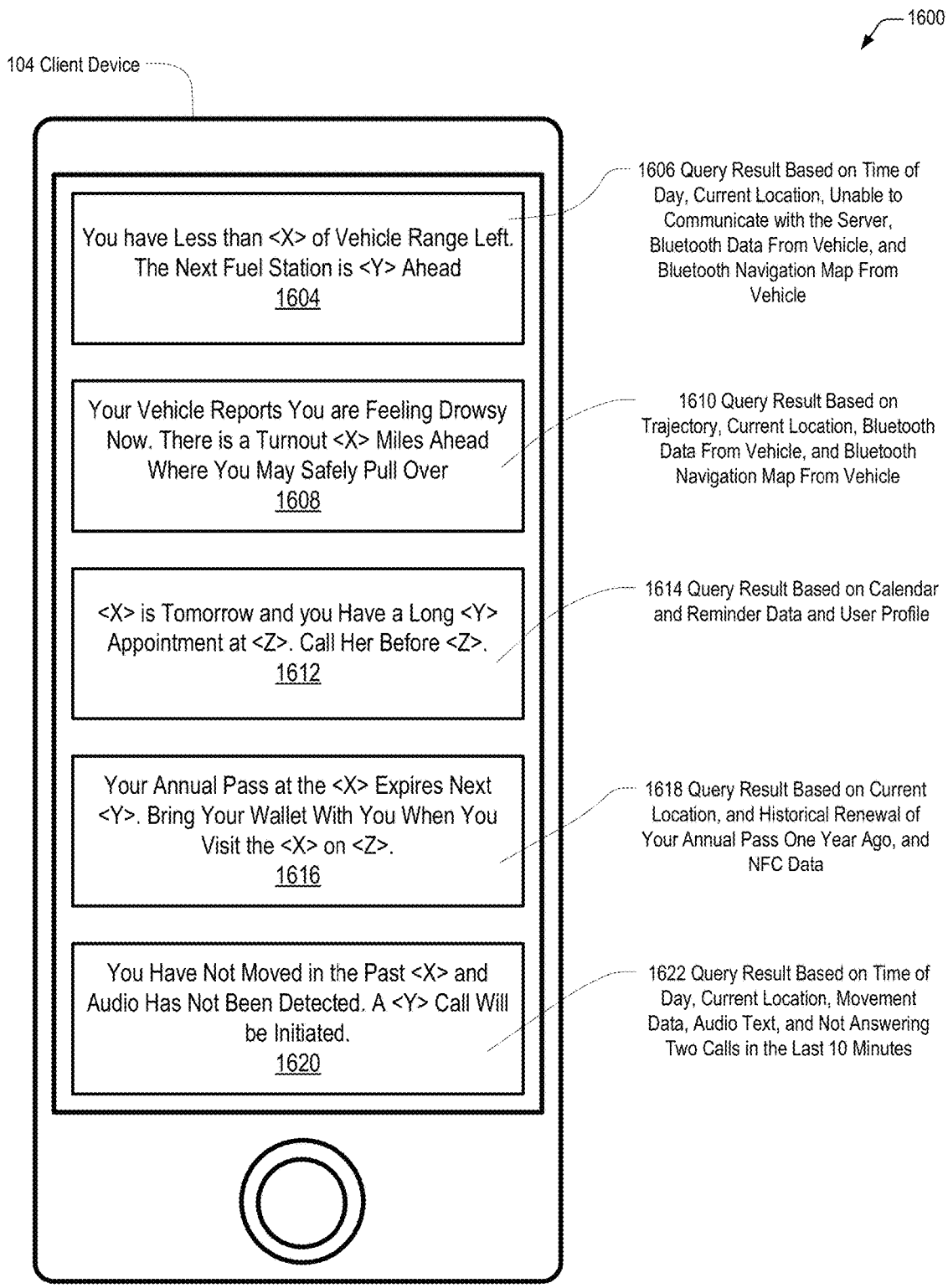

Fig. 17  Client Device Configuration
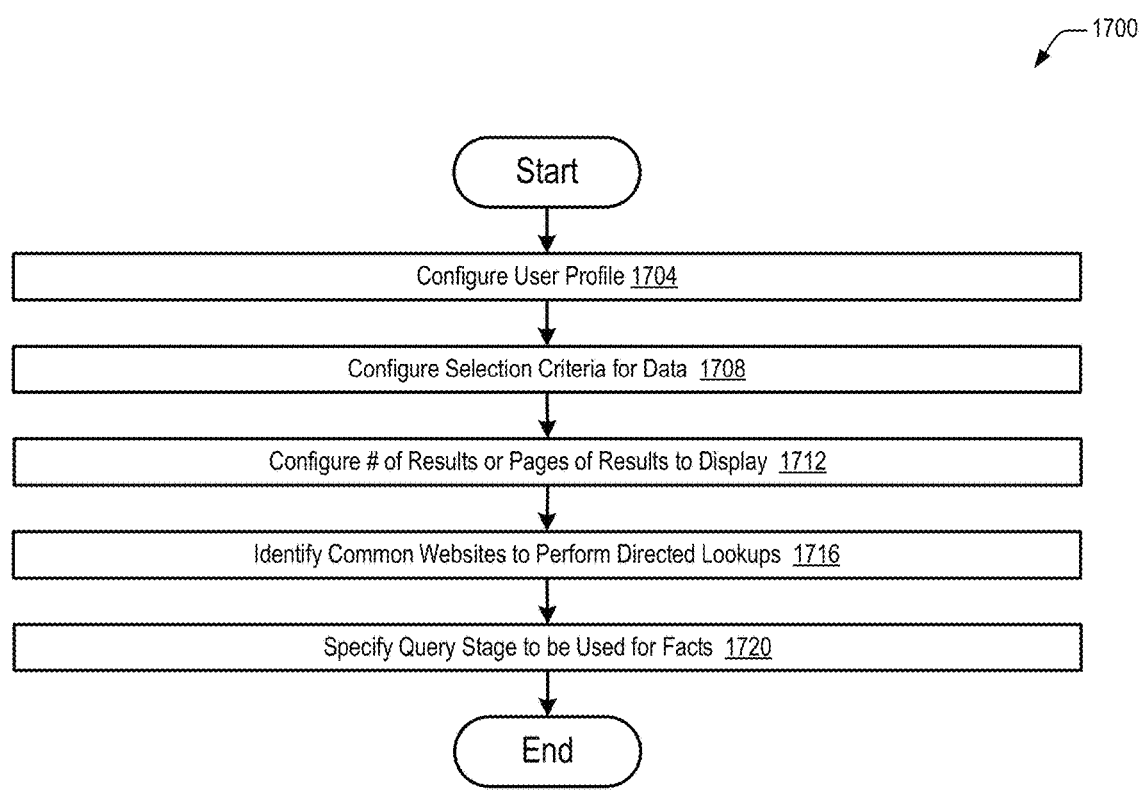

CURATED RESULT FINDER

FIELD

The present invention is directed to methods and systems for obtaining relevant information for users of computing devices. In particular, the present invention is directed to methods and systems for finding and presenting curated results on client devices.

BACKGROUND

The current way to search on the internet is to start with a specific idea, search for that idea, and sift through results to assess whether they meet the search criteria and provide the information needed. Current internet search (e.g., searches through search engines) integrates a wide variety of user data to inform search results, sometimes including location. Results are also weighted based on user and social data. Search strings are automatically completed based on historical search patterns.

The disadvantage to searching in this manner is the relatively narrow specificity required to compose a useful search. For example, if a client device needs to find information on "Chatfield State Park history," a user of the client device needs to provide this string to a search application to pull up that history. If the user needs trail maps for the park, the user needs to search for that specifically, and so on. When a client device searches for simply "Chatfield State Park" the user is presented with pages and pages of results—some of which may be relevant to the user inquiries, most of which may not be. If the search criteria is more uninformed or abstract, as in this example, a user may spend more time finding what they want and may ultimately abandon the search if the quality of provided results continue to be low.

SUMMARY

In accordance with embodiments of the present invention, a method is provided. The method includes one or more of obtaining client device data including a plurality of facts from a client device, limiting the client device data according to selection criteria, comparing the limited client device data to categorized historical data, determining one or more closest matches between the limited client device data and the categorized historical data, selecting, on the client device, content of interest from the one or more closest matches, and incorporating the content of interest into the categorized historical data. Each fact includes an entity, an observation, and an object.

In accordance with another embodiment of the present invention, a computer program is provided. The computer program includes one or more of obtaining client device data including a plurality of facts from a client device, limiting the client device data according to selection criteria, comparing the limited client device data to categorized historical data, determining one or more closest matches between the limited client device data and the categorized historical data, selecting, on the client device, content of interest from the one or more closest matches, and incorporating the content of interest into the categorized historical data. Each fact includes an entity, an observation, and an object.

In accordance with another embodiment of the present invention, a system is provided. The system includes a processor and a memory, coupled to the processor. The memory includes instructions, that when executed by the processor are configured to one or more of obtain client device data that includes a plurality of facts from a client device, limit the client device data based on selection criteria, compare the limited client device data to categorized historical data, determine one or more closest matches between the limited client device data and the categorized historical data, select, on the client device, content of interest from the one or more closest matches, and incorporate the content of interest into the categorized historical data. Each fact includes an entity, an observation, and an object.

An advantage of the present invention is it requires minimal user interaction in order to obtain useful results. Current search methods may require extensive input whether that is interacting with a virtual assistant or inputting text into a search engine. One button press functionality allows the present invention to bypass having to interact with a search engine or virtual assistant in most cases and is core to the idea itself.

Another advantage of the present invention is it provides a small number (usually one or two screens/pages) of relevant results to a client device display, rather than an endless number of pages of results to sift through for conventional search applications. The present invention query results are all relevant to the user of the client device compared to many irrelevant and unrelated results provided by a conventional search application.

Yet another advantage of the present invention is it provides several most relevant and useful items of information to a client device faster than conventional or traditional search engines can. The speed is due to presenting useful and actionable information in an initial query rather than requiring a series of more specific or detailed queries over time that each span many pages of results to review.

Yet another advantage of the present invention is it may provide useful results to a user even if an internet connection may not be currently available. On-device data stored on the client device itself may provide useful clues about what the user of the client device may be currently interested in. Conventional art search depends on the internet and does not access this.

Yet another advantage of the present invention is it provides useful quick results to handicapped, deaf, or speech-impaired users. The present invention does not depend on typing or speaking to provide data input. All initiation and selection requires only touch on the client device, which may be performed in any known way (finger, toe, stylus, etc.) that is compatible with modern touchscreen devices. Additionally, gesture detection may be used to initiate queries and/or select results in the absence of touching a touchscreen surface.

Additional features and advantages of embodiments of the present invention will become more readily apparent from the following description, particularly when taken together with the accompanying drawings.

BRIEF DESCRIPTION OF THE DRAWINGS

FIG. 1 is an exemplary block diagram of a curated results system, in accordance with embodiments of the present invention.

FIG. 2 is a client device block diagram, in accordance with embodiments of the present invention.

FIG. 3 is a server block diagram, in accordance with embodiments of the present invention.

FIG. 4A is a block diagram depicting client device and server intercommunication, in accordance with embodiments of the present invention.

FIG. 4B is a block diagram illustrating an exemplary relationship between a client device query and the observation conclusion language (OCL), in accordance with embodiments of the present invention.

FIG. 5A is a flow diagram for independent client device queries, in accordance with embodiments of the present invention.

FIG. 5B is a flow diagram for cooperative client device and server queries, in accordance with embodiments of the present invention.

FIG. 6A is a flow diagram for preparing data for client device queries, in accordance with embodiments of the present invention.

FIG. 6B is a flow diagram for preparing data for server queries, in accordance with embodiments of the present invention.

FIG. 7 is a block diagram illustrating client device pre-server actions, in accordance with embodiments of the present invention.

FIG. 8 is a table illustrating client device query content, in accordance with embodiments of the present invention.

FIG. 9A is a block diagram illustrating server processing actions for a client device query, in accordance with embodiments of the present invention.

FIG. 9B is a block diagram illustrating server processing actions for a client device query, in accordance with embodiments of the present invention.

FIG. 10 is a flowchart illustrating a server more determined best fit process, in accordance with embodiments of the present invention.

FIG. 11 is a block diagram illustrating client device post-server actions, in accordance with embodiments of the present invention.

FIG. 12 is a block diagram illustrating server post-query actions, in accordance with embodiments of the present invention.

FIG. 13 is a diagram illustrating a historical results database, in accordance with embodiments of the present invention.

FIG. 14 is a diagram illustrating a results presentation example, in accordance with embodiments of the present invention.

FIG. 15 is a diagram illustrating a results presentation example, in accordance with embodiments of the present invention.

FIG. 16 is a diagram illustrating a results presentation example, in accordance with embodiments of the present invention.

FIG. 17 is a flowchart illustrating client device configuration, in accordance with embodiments of the present invention.

DETAILED DESCRIPTION

The current way to search on the internet is to start with a specific idea, search for that idea, and sift through results to assess whether they meet the search criteria and provide the information needed. Current internet search (e.g., searches through search engines) integrates a wide variety of user data to inform search results. Results are also weighted based on user and social data. Search strings are automatically completed based on historical search patterns.

The disadvantage to searching in this manner is the relatively narrow specificity required to compose a useful search. For example, if a client device needs to find information on "Chatfield State Park history," a user of the client device needs to provide this string to a search application to pull up that history. If the user needs trail maps for the park, the user needs to search for that specifically, and so on. When a client device searches for simply "Chatfield State Park" the user is presented with pages and pages of results—some of which may be relevant to the user inquiries, most of which will not be. If the search criteria is more uninformed or abstract, as in this example, a user will spend more time finding what they want and may ultimately abandon the search if the quality of provided results continue to be low and not relevant to the user's needs. In contrast to conventional search, the present invention is directed to methods and systems for obtaining and presenting relevant information on a client device (e.g., smartphone, smartwatch, portable computer, etc.).

Referring to FIG. 1, an exemplary block diagram of a curated results system 100, in accordance with embodiments of the present invention is shown. The system 100 may include one or more client devices 104, one or more servers 108, and a database 120. A user 116 may be associated with each client device 104 and a network or cloud 112 may provide intercommunication between the client devices 104, servers 108, and a database 120. The network or cloud 112 may include a cellular network, a Wi-Fi network, a BLUETOOTH network, and the like. The network or cloud 112 may include public, private, or hybrid networks.

In FIG. 1, six client devices 104 and associated users 116 are shown: client device 104A associated with user 116A, client device 104B associated with user 116B, client device 104C associated with user 116C, client device 104D associated with user 116D, client device 104E associated with user 116E, and client device 104N associated with user 116N. Although multiple servers 108 may actually be present, when the description herein refers to "the server 108" it should be understood that any number of servers 108 may be actually present. Servers 108 may be virtual, or even include many smaller processing units than a classic 'server'. For example, servers 108 may include container-based deployments. Servers 108 may include processing units which operate on data sent from one or more client devices 104 to perform one or more services that process the data.

FIG. 1 shows two servers 108, identified as server 108A and server 108B. The database 120 provides a repository for previous query information and may include the historical results database 916 described herein. The database 120 may be associated with one or more servers 108 or be coupled directly to the network or cloud 112. In one embodiment, a curated results system 100 may include only a single client device 104. In another embodiment, a curated results system 100 may include a single client device 104 and a server 108. In another embodiment, a curated results system 100 may include a single client device 104, a server 108, and a database 120. In yet another embodiment, a curated results system 100 may include at least one client device 104, and any number of servers 108 and databases 120.

Referring to FIG. 2, a client device block diagram 104, in accordance with embodiments of the present invention is shown. Client devices 104 may include smartphones, smartwatches, portable computers, wearable computers, vehicular processors, or any other form of computing device. Although most commonly client devices 104 are portable in nature and able to move with a user to different locations, the present invention is also usable with static computing devices such as desktop computers. The client device 104 may include the elements and resources shown in FIG. 2, more elements or resources, or fewer elements or resources.

The client device 104 includes a processor 204 coupled to one or more memory devices 208. The processor 204 may include any type of processing devices, including microprocessors, microcontrollers, field-programmable gate arrays (FPGAs), or any other form of computing device. The one or more memory devices 208 may include any combination of volatile or non-volatile memory devices and stores data and applications executed by the processor 204. The memory 208 may store various forms of client device data 212, metadata 216, and applications 220. Applications 220 may include embedded applications included with the client device 104 as well as any number of $3^{rd}$ party applications 224. For example, applications 220 and $3^{rd}$ party applications 224 may include email clients, SMS text messaging applications, web browsers, setup/configuration programs, gesture detection programs, video and/or audio streaming programs, and the like. In general, $3^{rd}$ party applications 224 may be downloaded to the client device 104 from internet websites or other locations. Processes of the present invention that execute on the processor 204 may be either applications 220 or $3^{rd}$ party applications 224, or be included in an operating system of the client device 104.

The client device 104 may include a network interface 276, which may provide wired and/or wireless interconnection to the network or cloud 112 and allow bidirectional transfer of data with servers 108 and/or the database 120.

The client device 104 may include one or more on-device sensors 280, including but not limited to a GPS receiver 244, a camera 252, a microphone 260, and/or an accelerometer 268. The GPS receiver 244 may receive GPS coordinates 248 of the client device 104 and provide the GPS coordinates 248 to applications 220 or $3^{rd}$ party applications 224 in order to determine the location of the client device 104. The camera 252 may capture still images or video 256 of areas proximate to the client device 104 and the microphone 260 may capture audio 264 of areas proximate to the client device 104. The accelerometer 268 produces movement data 272 that may be used to determine a trajectory and destination of the client device 104. Sensors 280 may also include future sensors that may not be available to the client device 104 at the present time.

The client device 104 may include a display screen 228 and one or more hardware controls 236 or buttons. In one embodiment, the display screen 228 may be include a touchscreen feature to enable a user to make displayed selections or type characters by touching displayed icons on the screen. The displayed icons may include user interface controls (UI controls 232). The display screen 228 may produce an activated control 240A and/or a hardware control 236 may produce an activated control 240B, to the processor 204. Activated controls 240A, 240B may initiate the query processes of the present invention. Initiation of query processes of the present invention associated with the client device 104 may be performed by the UI control 232, a hardware control 236 such as a hardware button, a voice command received through the microphone 260, a gesture or facial expression captured by the camera 252, movement of the client device 104 detected by the accelerometer 268, or any other means. Although not shown, the client device 104 may also include one or more of speaker(s) to present results to the user 116 in audio form, an earbud or headphone jack, and/or a BLUETOOTH interface. The earbud or headphone jack and the BLUETOOTH interface may present audio to the user 116 in a more private manner.

By combining rich data on a user's client device 104, including on-device application 220, 224 usage data and application functionality (including functionality within $3^{rd}$ party applications 224), with information other people found useful from a similar time of day, location and in some cases trajectory (i.e., path to a destination)—the present invention provides a curated result in one-click or control activation 240 of a client device 104. The present invention provides far faster access to relevant results than the conventional art by integrating client device 104 local data and potentially including what other people found useful when at a similar time and place.

Referring to FIG. 3, a server block diagram 108, in accordance with embodiments of the present invention is shown. The server 108 may include at least one or more processors 304, one or more memory devices 308, and one or more network interfaces 324. The server 108 may include other components not shown in FIG. 3, including various components associated with a client device 104.

The processor 304 may be coupled to the memory devices 308. The processor 304 may include any type of processing devices, including microprocessors, microcontrollers, field-programmable gate arrays (FPGAs), or any other form of computing device. The one or more memory devices 308 may include any combination of volatile or non-volatile memory devices and stores data and applications executed by the processor 304. The memory 308 may store various forms of data 312, metadata 316, and applications 320. Processes of the present invention may be included in one or more applications 320 that execute on the processor 304.

The server 108 may include a network interface 324, which may provide wired and/or wireless interconnection to the network or cloud 112 and allow bidirectional transfer of data with other servers 108, database(s) 120, and one or more client devices 104.

In some embodiments, the server 108 may not be a physical server at all, but a virtualized server such as a "virtual machine" well known in the art. A single physical server may support hundreds of virtual machines.

In some embodiments, the server 108 may include a collection of one or more services providing serverless computing inside a cloud computing provider such as Amazon Web Services Lambda. Such serverless services may be chained together to provide functions as discussed in the present application.

In some embodiments, the server 108 may be a collection of microservices running in containers, a new but increasingly common paradigm for computing at scale and infrastructure-as-code. This may combine cloud services, such as Amazon Web Services (AWS) with technologies such as Kubernetes, Docker and Terraform.

The point is that computing infrastructure has been changing rapidly and continues to evolve. When the present application uses the term "the server" or "server" the term should be understood to include computing infrastructures that host software that implements the processes of the present invention.

Referring to FIG. 4A, a client device and server intercommunication diagram 400, in accordance with embodiments of the present invention is shown. Although client devices 104 may execute processes of the present application in the absence of connectivity to the server 108 and present useful results to a user associated with the client device 104, a cooperative process between the client device 104 and the server 108 is preferred. The reason for this is the server 108 (or a database 120 controlled/accessed by the server 108) stores useful data from other users 116/client devices 104 that may provide more useful information to a user than only information from the user's own client device 104.

When a client device 104 is communicably coupled to a server 108, the client device 104 assembles and transmits a client device query 404 to the server 108. The server 108 processes the client device query 404, performs query analysis, and transmits pre-selected results 408 back to the same client device 104 that provided the client device query 404. The client device 104 presents the pre-selected results 408 to a user 116 of the client device 108. The user 116 may select any number of pre-selected results 408 as selected results 412, and the client device 104 may transmit the selected results 412 back to the server 108. The server 108 stores received selected results 412 from client devices 104 (including other client devices 104) in order to provide more current information for future client device queries 404.

A query 404 performed by the present invention is not "searching" in a conventional sense. Producing conventional search results is a multiple step process what a user is looking for/what do they want or need? What method will I use to find the answer (application/search engine/automated assistant)? What manner of input does the method require (typing/talking/scrolling)? How much of the information that outputs from the method is relevant or useful on its face? Which specific result is most useful? How can the most useful result solve my current problem or inquiry? Is the most useful result presented in a manner that is consistent with the overarching context of my original question, or is it an independent, floating piece of data that I must re-integrate?

Query analysis as described in the present invention takes into account the above complications. A key idea is that client device queries 404 in the present invention start broad—where is the user 116 of the client device 104, what have other users 116 found useful where they are, what are points of data about the individual user 116 that could further refine results—and presents narrow, actionable/most useful results. In comparison, conventional or traditional searching requires the user 116 to start narrow, and get more and more narrow until they find (or don't find) that for which they're searching. Many traditional searches are hindered by the simple fact that the user 116 doesn't even know where to start searching—for example "I'm hungry in an airport terminal at 6 AM and I want breakfast".

An example of a traditional search operation (in a browser and search engine such as GOOGLE) may be: USER: "Airport Terminal A breakfast"→RESULT: A bagel business has a shop in Terminal A and it's the top result→USER: clicks through the business website, checks hours but they don't open until 7 AM→USER: presses back button to review results again→RESULT: 3rd result is another bagel business→USER: Opens the other bagel business site and observes they are open at 6 AM→USER: searches through the other bagel business site to verify that they have a shop in the terminal→USER: walks to physical terminal map to understand how to travel to the shop, and proceeds in that direction.

This example may be implemented with query analysis of the present invention in the following way: USER: presses one button on their client device 104 while standing hungry in Terminal A at 6 AM. RESULT: here are walking directions through the terminal to the nearest open bagel shop. Query analysis, through historical data correlated with sensor 280 and other data, is able to provide immediately useful results with little to no effort on the user's part.

Further considering this example, several points of data may be considered in the background of query analysis and may not be reliant on user 116 effort as originally described in the method of conventional search:—1) the user 116 and client device 104 are located in Terminal A at an airport, 2) the individual user 116 and other users 116 similar to them most often are looking for breakfast food at 6 AM in this location [on-device historical data shows the individual user 116 is a heavy breakfast consumer and often eats this meal out, crowd-sourced data shows that at 6 AM many other users 116 go to breakfast in Terminal A at this time of day, rather than a nearby restaurant].

One advantage of the present invention to perform query analysis is the absolute minimum of thought and effort goes into obtaining relevant information. The individual user's personal data (profile), the aggregated data of the population at large, and "environmental" data, are all important in informing what results are displayed by the present invention. The present invention requires less time to get information needed by the user 116 of the client device 104 in the moment.

In one embodiment, it is a "one control activation" application on a client device 104, or an integrated application within a computer operating system of the client device 104. When a client device 104 detects the control activation 240, an application 220 of the present invention presents a myriad of on-device inputs such as: location (including trajectory/predicted path & destination), a camera image 256, microphone audio 264, a calendar, notification, reminder, email, text message, weather, and any amount of 3rd-party application 224 data points (e.g., liked pages on a social media application), and the like. The output to the user 116 (display 228 and/or audio 264) automatically presents the most relevant information for what one normally does or needs at the current client device location.

In the previous Chatfield State Park example, some application inputs in this scenario may include geographic location, weather, time of day, park events/things to do, entry information/fees, and road/trail maps. The process of the present invention collects, ranks, and presents the most relevant data based on what most people have needed in the past, and also bases the query analysis on the user 116. The results may be displayed in a heads-up format—over one or two screens—rather than endless pages of results.

The present invention weighs what information to include based on the user 116 (e.g., calendar items like "meet dad at the marina at 3 PM," or an email receipt showing the user 116 has a state park pass), and also crowd-sourced history (e.g., at 3 PM when the weather is warm and the user "likes" a particular store on a social media platform, previous queries fitting that description may need trail maps).

The results provided by the present invention inform the user 116 what they need to know, when they need to know it, and in a manner that saves time sorting through results. Instead of starting specific and getting specific results, the present invention starts broad and presents the most useful information under the current conditions.

Another example may be a haircut service provider in a retail environment. A user 116 may activate a control 240 on a client device 104. The specific inputs in this example may be facts derived from microphone audio 264, functional and promotional information provided by the business, and past location tracking data. The client device 104 may present the current wait time (functional business/client information) and coupons (for this or future visit), and may offer to set a reminder for a next haircut (based on how often the client device 104 has visited the haircut provider based on past location tracking data).

A further example may be in an airport. The user 116 may activate the control 240 on the client device 104. The inputs may include a camera image 256, 3rd-party application 224 data, and both past location tracking data and real-time location data. The application may present the name and brief artist biography of a painting the user 116 captures on the client device camera 252, walk time to an airport gate, and flight information including delays (pulled down from the airline's website, or a deeper source such as the Global Distribution System (GDS)), and suggestions for nearby coffee shops (based on past location tracking—the user 116 may be known to want coffee at 9 AM when traveling, and there is a highly-rated coffee shop located in Terminal A).

Another example may be at the base of a famous skyscraper building and moving into the lobby. A user 116 may activate a control 240 on a client device 104 to initiate a query 404. The query 404 may include a current location of the client device 104, information about a lobby Wi-Fi router, user profile data, and an elevator schedule from the building's website. Query analysis may take into account various data points: the user 116 may be connected to the skyscraper building guest wireless WiFi network (i.e., they are in the building), the user 116 and client device 104 may be traveling from a different state (i.e., likely a tourist), and an elevator to the roof is within operating hours. Query analysis results may present time and ticket information for the elevator to the user 116. Tens of thousands of other users 116 of query analysis may have visited the skyscraper building previously, and the application may match these data points (e.g., a tourist from the same state as the user 116 purchased a ticket to the elevator and was there during operating hours). Each data point in this example may be weighted as follows:

Most Important (#1 weight): the user 116 associated with the client device 104 matches a profile of another tourist and will likely want to go to the roof of the skyscraper building. #2 weight: the elevator is within operating hours and tickets are available for purchase. #3 weight: the user 116 and client device 104 are physically inside the skyscraper building and is currently recognized by a guest Wi-Fi network within the building. Current location technology may allow a Wi-Fi device to detect a client device 104 that has Wi-Fi enabled, even if the client device 104 is not logically connected to the Wi-Fi device. This is explained in more detail in various internet articles that describe Wi-Fi location tracking.

The reason #3 is weighted as less important is simply the user's 116 close-by proximity to a possible ticket purchase in which they may be interested. If the user 116 were for sake of argument ten city blocks away from the skyscraper building—query analysis might place less priority on presenting the result. If the user 116 happens to work in the skyscraper building and historical GPS data/Wi-Fi connection data show they are there every weekday (again matching thousands of other users 116 who work there), that lower weighted data would further push down the result for the tourist attraction—as it likely would not interest a user 116 fitting that profile.

None of these examples require the user 116 to do anything more than activate a single control 240 on his/her client device 104. All the "work" of query analysis happens on the back end and is invisible to the user 116. The user 116 is only presented with useful, timely, nuanced information, and will likely spend less time and mental energy than composing and reviewing traditional search results. The present application provides the user 116 with actionable information rather than information to which they must react. The user 116 is automatically presented with the most useful information about what is around them based on personal on-device or cloud data, and also what others "like me" have needed in the past.

In one embodiment, the present invention may utilize crowdsourcing to obtain useful query analysis results. Crowdsourcing may involve obtaining work, information, or opinions from a large group of people who submit their data via the internet, social media, and smartphone applications. People involved in crowdsourcing sometimes work as paid freelancers, while others perform small tasks voluntarily. For example, some traffic applications encourage drivers to report accidents and other roadway incidents to provide real-time, updated information to application users. Crowdsourced history may provide useful and relevant data to users 116.

It is an objective of the present invention to be able to extend available data using sensors 280 and transformation agents for the data from those sensors 280. It is a further objective that that can be done in a vendor-independent and extensible way. The invention cannot anticipate what sensors 280 will become part of future devices, nor what conclusions can be drawn from comparing data from many sensors 280, but it must be able to accommodate new sensor data in order to process the raw and enriched data from those sensors 280 to provide more meaningful results for users' queries.

Using an example transformation that exists today, a $3^{rd}$ party application 224 can evaluate an image 256 in the camera view and recognize that image 256 as that of a landmark, such as the Empire State Building in New York City. The application 224 can do that by combining data from multiple sensors 280, such as the current location of the client device 248 and the direction the camera 252 is pointing. It has enriched the raw data from these sensors 280 and has created new data which is useful to be consumed by the present invention. That new data has meaning associated with it. What started as pixels in a sensor, formed an image 256, bound to a location and heading or orientation from other sensors 280, was interpreted by an application 220 which assigned meaning to the image 256, namely that the image is a representation of a specific known real entity in the real world at a given time.

Observation Conclusion Language

One challenge is that enriched data is siloed within the $3^{rd}$ party applications 224 and their servers. The silos exist due to several issues, including two technical issues that the present invention addresses:

1. Unstructured Data
2. Security and Privacy

Within the confines of the $3^{rd}$ party application silos, enriched data may very well be structured. But in order for that data to be communicated within the present invention in a meaningful way, it must be structured in a consistent way, so that data from multiple $3^{rd}$ parties does not need an adapter from each one to communicate to the processes of the present invention.

The present invention proposes a Software Development Kit (SDK) that client devices 104 will link with to transform data to an intermediate language called the Observation Conclusion Language, or OCL. The OCL is a structured application-independent language for describing observations in the real physical world, as well as in virtual worlds. OCL is effectively part of the query 404. It is structured data that provides context for the 'activation'. Once the facts are submitted, the server 108 responds with pre-selected results 408, and the user 116 may or may not select one or more of them, but that selection 412 requires no OCL context—the selections 412 are just a checkbox on a specific result(s).

The term observations in not meant to be limiting; it includes categories of things such as events (such as 'stopped' for a bus), relationships (such as proximity of the user to a car), presence (the bus is here), metrics (the bus is going 100 kilometers per hour), and any other detectable facts. The term facts here is also not meant to be limiting, rather, it allows discussion about the data that flows from an observing application 220,224 or client device 104 to the servers 108 of the invention, and is meant to help communicate that the statements indicate elements of verifiable truth. In one embodiment, the pre-selected results 408 and/or the selected results 412 may be communicated without using OCL. In another embodiment, the pre-selected results 408 and/or the selected results 412 may be communicated using OCL. For example, previously selected results 728 may be stored in a memory of the client device 104 as OCL facts or in another format that may be more efficient/immediately useful. Additionally, the historical results database 916 may store entries as OCL facts or in another more useful format.

Referring to FIG. 4B, a block diagram 450 illustrating an exemplary relationship between a client device query and the observation conclusion language (OCL), in accordance with embodiments of the present invention is shown. The client device 104 produces client device queries 404. In one embodiment, the client device 104 may transmit any number of client device queries 404 to the server 108. In another embodiment, the client device 104 may not be able to communicate with the server 108. In such cases, the client device queries 404 may be serviced by the client device 104 itself. Pre-selected results 408 are created by the client device 104 and presented to a user 116 of the client device 104.

A client device query 404 may include one or more facts 454. FIG. 4B shows three facts 454 as part of a client device query 404, identified as facts 454A, 454F, and 454S. Each fact 454 includes an entity 458, an observation 462, and one or more objects 466. In the illustrated example, fact 454A includes entity 458A, observation 462A, and object 466A, Fact 454F includes entity 458F, observation 462F, and objects 466F and 466G, and fact 454S includes entity 458S, observation 462S, and objects 466S, 466T, and 466U. Facts 454, entities 458, observations 462, and objects 466 are described in more detail below.

A fact in the present invention is a truth that may be produced using contextual data derived from sensors 280 or acquired from the client device 104 operating system, applications 220, 224, or other data sources. Examples of facts are:

1. The car is red
2. The car is stopped
3. The car is 10 meters away from the camera
4. The sound heard at 10:04 AM local time at the microphone is music by James Taylor
5. The client device is travelling at 20 Kph at heading 155 degrees
6. The queue at the donut store has 12 people in it The OCL may be implemented within a structured language such as JSON or XML or other means of declaring data, such as GraphQL. Regardless of implementation, the OCL communicates an observation made, directly or indirectly, from a collection of contextual data present at a client device 104. For example, the contextual data may have come from onboard sensors 280, onboard applications 220, 224, a user profile, directed searches, sent to the client device 104 from an internet-connected service such as the PAYPAL API to locate past payments, the Facebook Graph API to read friend profiles, the FlightAPI to find airline gate information at airports, and the like.

Observations may be made asynchronously or synchronously with the control activation 240 of the present invention. They may be made beforehand and cached for transmission with the control activation 240, or they can be constructed as a consequence of the control activation 240. For example, the current location of the client device 104 may be an easy observation to make in existing client devices 104 through built-in APIs; there is no reason to do that in advance. However, processing camera image data 256 or microphone sound data 264 is resource-intensive and may be preferred to be done in advance and cached.

OCL is analogous in some ways to the eXperience API, also known as the xAPI. The xAPI is essentially a structured, application-independent language for declaring and communicating that a learner did something with some content. For example, a specific student took a specific test and obtained a passing grade. xAPI enables learning management systems to interface with to $3^{rd}$ party training and testing modules. The fundamental structure of an xAPI message has an actor, a verb and an object. The xAPI language has to solve the problem that the learning management system can not anticipate all the possible modules that $3^{rd}$ parties will plug into it, but needs to report on learning events for individuals and collections of individuals.

The OCL is different from the xAPI in that the OCL statements are communicating observations. Observations are somewhat like verbs in the xAPI. A module observes that an entity is related to one or more objects. The entity may be the user 116 of the present invention, or some object or other person the user 116 is related to or has interest in.

Human languages are structured such that there is a subject, a verb and an object. OCL is analogous in that the entity literally is the subject, the observation is similar to a verb, and the object is actually a collection of objects that describe the details of the observation. In English, we might say "That café has a short queue"; in OCL we might express, in structured data, that "The $3^{rd}$ Corner Café has a queue of 3 men and two women, including one male child".

The subject in this example is the café itself, but it could also have been the camera 252 in the client device 104 which made the observation. The choice is up to the developer of the application making the observation, along with the lexicographers who manage the OCL. The entity might be the $3^{rd}$ Corner Café. The verb in the sentence is the word 'has'. To make this more structured, OCL's observation is about the queue length, which is something of interest applied to many subjects and so becomes part of OCL's official language. Observations generally include time and location if available. The object in the sentence is 'queue', with 'short' being a subjective adjective. In OCL, there is no subjectivity; rather the objects of the statement provide factual details about the queue length. An OCL statement contains:

an entity 458, which is the subject for which it is going to state a fact about a set of objects 466, which define factual, meaningful, specifics somehow related to the entity 458 the observation 462, which is a highly structured relation that binds the entity 458 with the objects 466

An OCL statement is effectively a highly structured sentence. The structure of an OCL statement presented here by example in JSON for readability:

```
{
  "entity": {
    "type": "person",
    "uuiid": "123e4567-e89b-12d3-a456-426655440000",
    "friendly": "Vicky Smith",
    "context": "self"
```

```
        },
        "observation": {
          "observed": "nearby",
          "uuid": "934dbca-e89b-12d3-a456-426655440000",
          "metric": 20,
          "units": "meters",
          "magnetic_direction": 104,
          "when": 1651098709,
          "where": {
            "lat": 33.94389043930125,
            "lon": -118.19712647355676
          }
        },
        "objects": [
          {
            "type": "automobile",
            "identification": "unknown",
            "color": "red"
          }
        ]
      }
```

JSON (JavaScript Object Notation) is a simple data representation where JSON objects (as differentiated from objects 466) are represented in curly brackets ({ ... }), and JSON objects are made up of key/value pairs. The 'entity' key 458 in the example is the first of three required keys, and it has a value which is itself a JSON object containing multiple key/value pairs, including the key 'type' with value 'person', indicating that the entity 458 referred to is a human being.

This reasonably simple statement communicates that a specific person named Vicky Smith is 20 meters from a red car at compass heading 104 degrees relative to magnetic north. Alternately, a statement could be constructed that an entity of type camera 252 is 20 meters from a red car at compass heading 104 degrees relative to magnetic north, with an association elsewhere that the camera 252 is part of a client device 104 owned by Vicky Smith. Because the context is "self", in this example Vicky is the user 116 of a client device 104 which has implemented the present invention. The 'when' key describes when the observation occurred, because this statement could be delivered well after the observation 462. In this case the units for time is in "Unix Epoch Seconds" since Jan. 1, 1970, but other formats are possible and likely. The "where" data defines where the observation 462 was made using latitude and longitude, but other location information is possible. The "identification" field is unknown, in this case, but could be further structured using information such as a license or vehicle identification number (VIN number), or a combination of such data. Whether specific keys are required or optional is a decision for the schema designer; requirements will be enforced through the SDK.

The keys in this example are just a beginning. The taxonomy is extensible by developers working for 3$^{rd}$ party application 224 companies in the same way that some internet applications are extensible—user generated content created by developers who want their applications to contribute to a better understanding of the world around humans using smart, portable devices 104 containing sensors 280.

Observation Taxonomy

The body of information maintained that enables consistent communication about entities 458, observations 462, and objects 466 is herein referred to as the observation taxonomy (OT). Humans interact with the OT by submitting changes which are reviewed by peers in a manner similar to how a developer submits a pull request to a git repository.

The review process might very well occur over a service such as github, but differs from most organizations in that the reviewers are self-organizing and self-directing with the objective to keep the observation taxonomy as simple and easy to use as possible. The self-directed body of people that maintain the observation taxonomy is herein called the observation taxonomy collaborative.

The OCL SDK makes it easy for developers to create and transmit statements according to the accepted taxonomy. For example, it requires that each of the main elements are present: entity 458, observation 462, and object(s) 466. It makes sure that messages are properly formed, sent to servers 108 when appropriate, handling retries and timeouts. The challenges of communicating with a server 108 with unreliable networks are hidden in the SDK below easy-to-use calls made from the application 220.

As application code is being written, the SDK enables fields to be pulled from the existing taxonomy. To clarify by example, but not in any way limiting, common "observed" elements could be:

Nearby—the entity 458 is physically close to the object

Heading—the entity 458 is moving toward one object 466 while moving away from a second object 466 (a use case for having multiple objects 466 in a statement)

Presence—the entity 458 has a connection to a network identified by the object 466

Alert—the entity 458 has a problem or danger represented by the object 466 (for example, a smoke alarm went off at the user's home)

Emotion—the entity 458 is displaying evidence of one or more emotions, for example elation or fear, as represented by the objects 466 in the OCL statement Communicated—the entity 458 sent a message to another entity 458 where the object 466 contains contextual information about the message (for example, it might contain statistics on words used or possibly an embedded OCL statement so that observations 462 about the sent message can be consumed by the invention. A use case here is that a 3$^{rd}$ party application 224 might perform natural language processing on the communicated message and determine that the user 116 is anxious about meeting his new supervisor—the object 466 is actually an OCL 'emotion' observation)

The list of observations 462 is unlimited, but finite and countable at any point in time. Observation schemas may become obsolete, incorrect, or insufficient due to any number of issues, including new laws or missing or redundant data. In order to deal with the need to change the schema for observations 462, the present invention uses the notion of 'retirement'. A retired observation 462 is no longer usable by the present invention. It isn't deleted because the invention still wants to recognize it and inform the caller so that the developer or the application can make a change to conform to an updated schema. The caller refers to the software code that presented the fact to the application programming interface (API).

For example, if an application 220 passes a retired observation 462 to the service at the server 108, the service may simply return an error code communicating the retirement, which the application 220 should then pass back to its development team to adjust the related statements to conform to the new taxonomy. The retired error code may include a suggested schema UUID or a URL for the developer to evaluate. Application developers ideally develop such applications 220 with the ability to adapt to simple changes without requiring source code changes. The SDK will include the ability to query the current observation taxonomy to allow for simple changes to be automated by the client device 104 software. More complicated changes would benefit from a template defined by the developer that allows application data to be inserted into the updated template which conforms to an updated OCL statement.

When a developer has developed a new application 220 which makes conclusions using measurements and observations 462, he/she can visit the observation taxonomy web application through a web browser and determine if there is already an appropriate observation 462 that he/she can use.

If an appropriate observation 462 exists, he/she can make a call to the SDK that passes the OCL statement and includes the appropriate information so that her observation 462 is clear to service at the server 108 what exactly was observed If an appropriate observation 462 does not exist, he/she can hire a 3$^{rd}$ party to champion his/her need and go through the approval process to add the observation metadata, or he/she can do so him/herself The user interface for exploring the existing taxonomy may include the ability to apply keywords to look for existing entities 458, objects 466, and observations 462. These keywords may also be user-generated content and have a low barrier to adding to the database. For example, a developer that has created an application that recognizes music which can identify the musical performer might first scan for "music" and find no entries. Then the application scans observations for the keyword "identify", and finds an entry "recognize". The returned schema for the 'identify' element might be:

```
{
  "observation": {
    "observed": "recognize",
    "when": 1651098709,
    "where": {
      "lat": 33.94389043930125,
      "lon": -118.19712647355676
    }
  }
}
```

The returned schema is shown in JSON for readability, but it might be presented differently, and the server 108 that returns the data might use a different language, format, schema or means not yet contemplated. The information required to supply to the SDK to make an observation 462 is presented in human readable form; that is the only requirement. The developer's objective now is to fill in an entity 458 and object(s) 466 so that the observation 462 makes sense. Even though the developer thought of the word 'identify' first, the developer realizes that the application is recognizing performers of music, so the developer accepts this observation name. The developer then further considers what entity 458 is doing the recognizing. Since the service requires no user input, but rather uses what the client device 104 hears over the microphone 260, for example, the application 220 then scans for 'microphone' and gets a returned schema that may appear as follows:

```
{
  "entity": {
    "type": "device",
    "uuid": "89432591-e89b-12d3-a456-426655440000",
    "friendly": "Microphone",
    "context": "embedded"
  }
}
```

The developer may also receive detailed information about each field, such as what the context field means and what legitimate values are. The UUID field in this case uniquely identifies a microphone 260. If the user 116 is an Italian speaker this might come back as:

```
{
  "entity": {
    "type": "device",
    "uuid": "89432591-e89b-12d3-a456-426655440000",
    "friendly": "microfono",
    "context": "embedded"
  }
}
```

It is envisioned that type and context fields are not localized but are generally English terms, though they could be any language as allowed by the maintainers of the OT. The UUID is that identity of the schema element itself and it alone is used when sending information to the server 108. The other elements are for users 116 to be able to read more readily.

The developer now has two-thirds of his statement understood. His application 220 may enable the microphone 260 to recognize something the OT may not yet understand. The developer submits the equivalent of a pull request to the maintainers, asking that they add an object 466 of type music, and proposes this sub-schema (by example):

```
{
  "objects": [
    {
      "type": "music",
      "uuid": "89432591-e89b-12d3-a456-5297765002124",
      "identification": "Little Deuce Coupe",
      "composer": "Beach Boys",
      "artist": "multiple"
    }
  ]
}
```

The developer must also submit the meanings of each field, the data type, whether the field is required or not, and any limitations such as length or language. Assuming the developer's 'pull request' is accepted, the OT is updated and the server 108 will provide UUIDs to enable submission of these statements.

It is important to note that the UUID does not identify the specific instance of any of the entity 458, observation 462, or object(s) 466 passed in the observation statement. Rather it is one-to-one with the type and observed fields so that the server 108 may accurately process the data.

OCL Use Cases

Audio in Music Bar Example

Elsewhere in the present application is an example about tagging music. There is a well-known consumer application 224 which allows the user 116 to determine information about the music currently present over the microphone 260. The activation is also called 'tagging' by some users. There is also a mode to listen in the background and identify music without specific intervention. For the present invention to use this capability, the music recognition application uses the SDK of the present invention. When it recognizes a song, it creates an OCL statement that may be sent immediately or at the next control activation 240 of the present invention. For example, these observations may be stored in a general queue of observations that may or may not be relevant for the current user's result request issued to the present application.

An example OCL statement representing a single tagging event might look like:

```
{
  "entity": {
    "type": "microphone",
    "context": "host device"
  },
  "observation": {
    "observed": "song",
    "when": 1603108709,
    "where": {
      "lat": 31.77930125,
      "lon": -111.51647355676
    }
  },
  "objects": [
    {
      "title": "Ballad for Kay",
      "artist": "Acoustic Alchemy",
      "genre": "new age",
      "year": 1988,
    },
    {
      "title": "Kid's Stuff,
      "artist": "Eric Marienthal",
      "genre": "jazz",
      "year": 2007,
      "activation": "background"
    },
  ]
}
```

This observation relates the reality that the microphone 260 of the client device 104 running the process of the present invention heard the song "Ballad for Kay", and was tagged by the user 116. It also indicates that previous to that, the song "Kid's stuff" was heard in the background. Once the present invention can tell that the user tags music, or doesn't tag music, many things can be done with that information.

For example, if multiple users 116 of the present invention tag music at a same bar, the present invention may place a callback on an event such as unlocking the phone, allowing the application callback to launch the tagging feature with no additional input.

Photo Capture and Popular Coffee Shop Example

A user 116 of the present invention may be at an airport and is taking input from a camera 252, 3$^{rd}$ party application 224 data, and past and present location data. Herewith we detail how that may happen, using observations made by different applications. These example observations are exemplary only and not limiting, and are simplified for readability.

1. An application 220, 224 or client device 104 operating system may process the camera 252 data (i.e., images and video 256) using the SDK of the present invention. It recognized and delivered biographical information for the painting that the subject user pointed his camera 252 at. This resulted in an observation being produced that may be useful to others. The observation was captured at the time of the camera application image 256 capture, but may be produced in response to the user 116 activates the client device control 240. The observation might look like the following:

```
{
  "entity": {
    "type": "person",
    "friendly": "Vicky Smith",
    "context": "self"
  },
```

-continued

```
  "observation": {
    "observed": "art",
    "when": 1687208709,
    "where": {
      "lat": 31.44389043930125,
      "lon": -113.69712647355676
    },
  },
  "objects": [
    {
      "friendly": "Moaning Lisa",
      "type": "painting",
      "artist": "Floyd Bombecker"
    },
  ]
}
```

In this use case, the identification of this piece of art is merely interesting—it might be used in another scan. What others can know if they are interested is that this painting was at the location identified at the time identified in the observation. As a result, this user 116 has contributed to greater contextual knowledge.

2. The present invention may also be used by another user 116 who inadvertently pointed his camera 252 at front of a highly-rated coffee shop, and the application 220 recognized the queue length and logged an observation as follows:

```
{
  "entity": {
    "type": "business",
    "friendly": "Highly Rated Cafe "
  },
  "observation": {
    "observed": "queue length",
    "metric": 5,
    "units": "people",
    "when": 1687298709,
    "where": {
      "lat": 31.94389043930125,
      "lon": -113.19712647355676
    }
  },
  "objects": [
    {
      "type": "male",
      "count": 3,
    },
    {
      "type": "female",
      "count": 2,
    },
    {
      "type": "children",
      "count": 1,
    },
  ]
}
```

This observation, though sent by another user 116 and client device 104, may be relevant for the current user 116 and may be used in producing the results 408. Namely, that even though the café is highly-rated and normally has a long queue, the user 116 may have enough time to visit the café before his/her flight. Supporting information may be sent, as well.

3. When the user 116 last loaded a calendar application 220, which also uses the present invention's SDK, it made an observation 462 about his/her appointments. An example fact 454 containing the observation 462 might look like the following:

```
{
  "entity": {
    "type": "person",
    "friendly": "Vicky Smith",
    "context": "self"
  },
  "observation": {
    "observed": "appointments",
    "when": 1683308709,
  },
  "objects": [
    {
      "type": "airline flight",
      "when": "09:27 CDT",
      "boarding": "08:50 CDT",
      "where": "Gate D9"
    },
  ]
}
```

4. The user's current location and direction of travel may be an observation 462 made by the present invention's result finder application 220. It might look like this example (simplified):

```
{
  "entity": {
    "type": "person",
    "friendly": "Vicky Smith",
    "context": "self"
  },
  "observation": {
    "observed": "location",
    "when": 16922308709,
  },
  "objects": [
    {
      "latitide": "33.7741688",
      "longitude": "-118.0523388"
      "heading": 147,
      "velocity": {
        "metric": 3,
        "units": "kph"
      }
    },
  ]
}
```

5. When the user 116 activates the control 240, the four facts 454 containing observations 462 above may be sent to the server 108, which may respond with a result set 408 that includes a suggestion that the user 116 visit the highly-rated café because she has time before boarding her plane, she's heading the right direction, she likes cafes (from previous result interaction) and it's an opportunity she might not get next time.

When the user 116 interacts with the results 408, the user 116 might select a button 232 on the client device 104 labeled something like "go there" to get directions to head to the café. The activation of that control 232 may be transmitted to the server 108 and may be accumulated for other users 116 as well for tracking popularity. For example, the control activation 240 may be stored in a historical results database 916 of a server 108 or in historical click-through data 720A of the user's client device 104, as will be discussed later.

Bagel in Terminal A at the Airport Example

The "Bagel in Terminal A at the Airport example" is possible utilizing a number of different observations, but a simple example follows. Each of the following example applications utilize the SDK of the invention:

1. An application 220, 224 utilizing Wi-Fi and/or BLUETOOTH beacons to provide internal location and trajectory (heading) information using triangulation (i.e., a triangulation application)
2. An application 220 that provides results to scans for "breakfast" or "hungry" or "food" (perhaps a web browser or a map application (i.e., a conventional search application)
3. A text scraper application 220 on the client device 104 that found "breakfast" or "hungry" or "food" in a message (i.e., a text processing application)
4. A payment application 220, 224

Prior to the current user 116 walking around the terminal, other users 116 may have used combinations of these applications 220, 224. They each contribute to the current user's experience using the following example observations:

The text scraper application 220, which has embedded natural language processing, produced this observation 462, where Fred mentioned to his wife, Sally, that he is safely at the terminal but is really hungry:

```
{
  "entity": {
    "type": "person",
    "uuid": "1842ab34-e89b-12d3-a456-426655440000",
    "friendly": "Fred Johnson",
    "context": "self"
  },
  "observation": {
    "observed": "informing",
    "uuid": "75034de-e89b-12d3-a456-426655440000",
    "type": "text"
  },
  "objects": [
    {
      "receiver": {
        "type": "person",
        "uuid": "9da43fa-e89b-12d3-a456-426655440000",
        "friendly": "Sally Johnson",
        "context": "spouse"
      },
      "concepts": [
        "starving",
        "safe",
        "arrived"
      ]
    }
  ]
}
```

Note that in this case the text scraper application 220 has somehow learned that Sally is Fred's spouse (e.g., by reviewing a profile of Fred on the client device 104), but other contexts are possible, including simply "other" to indicate someone other than 'self'. Furthermore the natural language processing might be far more sophisticated in terms of subjects, verbs and nouns, but for demonstration purposes keyword presentation and recognition may be sufficient.

The triangulation application 220, 224 produces this observation 462, which shows Fred moving in the direction of the bagel shop at 6:10 am:

```
{
  "entity": {
    "type": "person",
    "uuid": "1842ab34-e89b-12d3-a456-426655440000",
    "friendly": "Fred Johnson",
    "context": "self"
  },
```

-continued

```
"observation": {
    "observed": "walking",
    "uuid": "1292313-e89b-12d3-a456-426655440000",
    "magnetic_direction": 104,
    "velocity": 20,
    "units": "meters/minute",
    "when": 1650892200,
    "where": {
        "lat": 33.94389043930125,
        "lon": -118.19712647355676
    }
},
"objects": [ ]
}
```

Lastly the payment application 220, 224 captures the business which concluded a sale:

```
{
    "entity": {
        "type": "person",
        "uuiid": "1842ab34-e89b-12d3-a456-426655440000",
        "friendly": "Fred Johnson",
        "context": "self"
    },
    "observation": {
        "observed": "purchased",
        "uuid": "eb38a2f-e89b-12d3-a456-426655440000",
        "when": 1651098709,
        "where": {
            "lat": 33.94389043930125,
            "lon": -118.19712647355676
        }
    },
    "objects": [
        {
            "vendor": "Bodacious Bagels",
            "product": "Everything Bagel"
        }
    ]
}
```

The server 108 of the present invention accumulates such information and may utilize machine learning to sort through large amounts of information and conclude that "Bodacious Bagels" is a favorite stop at this location at this time of day.

When the current user 116, Vicky, presses the "hungry" button, the server 108 is able to recommend "Bodacious Bagels" and instruct Vicky how to get there.

Security and Privacy

Many modern applications today solicit user 116 approval to access data of other services through OAuth. For example, an email client needs access to email messages kept by an EXCHANGE server managed as an OFFICE-365 service. In order to allow that, the application includes an OAuth connection the company's server which includes a callback to the application. As part of setting up that connection, the application declares to the company's server what types of information it will require. A user interface is launched on the company's server where the user must authenticate to the EXCHANGE server using whatever requirements the company has for that service. Once that is done, the company uses the registration information to inform the user 116 what information will be shared with the application. Generally, these are just one way communications—a list of privileges that will be granted—but they can include choices the user 116 can make. Once the user 116 approves, the company may allow the application to access information consistent with its declaration, but not other information.

In one embodiment, it is the intention of the present invention that any application 220, 224 that uses the SDK of the invention will register with the result finder service hosted by servers 108 to acquire an API key. An API key enables the calling code to contribute to data curated by the present invention. The API key may be used to acquire and refresh access tokens, which are shorter in lifespan. This is common in protocols such as OAuth, and enables the service to protect the integrity of the data being received. OAuth, in addition, authorizes applications to utilize a user's private information in specific and controlled ways.

When the application first calls the SDK on a particular device using the API key, the SDK returns a value that indicates they must go through an authentication/permission interchange. The challenge is that the present invention does not know where the application data, being processed and possibly enriched by the application, originally came from. By policy and agreement during the sign-up phase, before getting an API key, the invention may require that the application communicate to the user 116, when using authentication such as OAuth to data providing services, that the application will share this information with the present invention in order to provide better results during result finding events.

The way OAuth works is that the requesting code provides a callback at registration time with the data providing entity. In order for the curated result finder to be included in this authorization, the application 220 (Text scraper in this example) must provide a callback to the curated result finder, and the curated result finder must provide a callback to the application 220 to save in the registration for the data providing service.

Referring to FIG. 5A, a flow diagram for independent client device queries 500 in accordance with embodiments of the present invention is shown. Independent client device queries occur when a client device 104 is unable to contact the server 108. The server 108 may have experienced a malfunction or failure, be turned off, the connection through the network or cloud 112 may not be available, or any other type of malfunction may have occurred. The process may be initiated when the user 116 of the client device 104 activates a control 240, as previously discussed.

In response to the control activation 240, the processor 204 collects data from the client device 504. This is described in more detail with reference to FIG. 7. The data may come from a user profile, skimmed data from onboard applications 220, data from $3^{rd}$ party applications 224, and/or data from directed searches performed by the client device 104. For example, the processor 204 may access an airline website on the internet to determine if an upcoming flight later in the day is on time.

In response to collecting the data 504, the processor 204 attempts to contact the server 108 through the network interface 276, and is unsuccessful 508. The processor 204 may attempt to contact the server 108 any number of times but for many reasons may be unsuccessful. Because the server 108 cannot be contacted, the client device 104 must rely on itself to provide perhaps more limited meaningful results to the user 116. The processor 204 next prepares data for client device queries 512. This is explained in more detail in FIG. 6A.

With the client device data collected 504 and any optional directed searches completed, the processor 204 queries the historical click-through data 516 stored in a memory of the client device 104. The historical click-through data stores selected results for previous queries conducted by the user 116 and the client device 104.

The query may produce a number of relevant results. In one embodiment, the processor 204 may prioritize the relevant results into an order from most relevant results to least relevant 520. Most relevant results may include events occurring now or in the near future, events that may affect being able to attend the event at a scheduled time, events occurring at the current location of the user 116/client device 104, and the like. With the results ordered, the processor 204 may limit the most relevant results 520 in order to reduce the number of results presented to the user 116. In one embodiment, the number of results may be limited to a predetermined number previously configured on the client device 104. In another embodiment, the processor 204 may limit the number of results to a previously configured number of displayed pages on the client device display screen 228.

The processor 204 next displays 524 the (limited) most relevant results on the display screen 228 of the client device 104. In one embodiment, the processor 204 may instead or in addition present the results audibly through a speaker of the client device 104 to the user 116. The user reviews the displayed results 524 and/or listens to the audio presentation of the results and may select one or more results 528. For example, the user 116 may tap on the display screen 228 to select one or more results 528 or provide a spoken selection 528 of audibly presented results.

The processor 204 stores the selected results as click-through data 532 to a memory device of the client device 104. In one embodiment, the client device 104 may maintain click-through data for all previous queries since the client device 104 was activated. In another embodiment, the client device 104 may maintain click-through data in memory for only a predetermined number or time period of most recent previous queries. For example, the most recent 500 queries or queries within the previous month. In another embodiment, the processor 204 may automatically delete an oldest click-through result when the memory is full and a new click-through selected result 528 is being added. This may advantageously maintain the value of more recent click-through results without requiring a larger memory device to be purchased/installed.

Referring to FIG. 5B, a flow diagram for cooperative client device and server queries 550 in accordance with embodiments of the present invention is shown. FIG. 5B applies when the server 108 is available and in communication with the client device 104. Asynchronously to any communications between the client device 104 and the server 108, one or more other client devices 554 may be communicating with the server 108 and issue queries as needed. The server 108 provides the other client devices 554 with pre-selected results, and users 116 of the other client devices 554 select various results and make use of the selected results. The other client devices 554 transmit other client device selected results 558 back to the server 108, and the server 108 may store the selected results in historical results 562A (i.e., in the historical results database 916, as will be discussed with reference to FIG. 9). Thus, updates to the server's historical results database 916 may be constantly occurring, and client device queries 404 are always serviced by the most current data in the historical results database 916. It should be noted that these updates to the server's historical results database 916 may also be occurring in the process illustrated in FIG. 5A. However, they may appear to be in the background since the client device 104 is out of communication with the server 108.

Similar to the independent process of FIG. 5A, the process of FIG. 5B may be initiated when the user 116 of the client device 104 activates a control 240 on the client device 104, as previously discussed. In response to the control activation 240, the processor 204 of the client device 104 collects data from the client device 504. This is described in more detail with reference to FIG. 7. The data may come from a user profile, skimmed data from onboard applications 220, data from $3^{rd}$ party applications 224, data from directed searches performed by the client device 104, and the like.

In response to collecting the data 504, the processor 204 prepares data for server queries 566. This is explained in more detail in FIG. 6B. With the client device data collected 504 and any optional directed searches completed, the processor 204 prepares and transmits a client device query 404 to the server 108. The server processor 304 receives the client device query 404 through the network interface 324 and parses the query 570. In one embodiment, parsing the query 570 may include ordering the facts based on a desired order of lookup in the historical results database 916. This is explained in more detail with respect to FIG. 9A. In another embodiment, parsing the query 570 may include separating the query into a number of facts 454 contained within the query 404, where each fact 454 may include an entity 458, an observation 462, and one or more objects 466. This is explained in more detail with respect to FIG. 9B.

In one embodiment, as facts 454 are being received from a client device 104, the server 108 may asynchronously, relative to the client devices 104 and users 116, fetch data from related web services that might help an eventual query. For example, a fact 454 that indicates that the user 116 is arriving at an airport might trigger a microservice to query airline gate arrival and departure data as facts 454 that may assist in providing meaningful results to the user 116.

In one embodiment, the server processor 304 may perform one or more historical database 916 lookup operations based on query content and order 574. Each of the historical database 916 lookup operations may result in a result, which is temporarily stored until all of the historical database lookup operations 574 have been completed. The processor 304 reviews the results and prioritizes and limits the results 578. In one embodiment, the processor 304 may prioritize and limit the results 578 in a similar manner as the processor 204 did in step 524 of FIG. 5A. In another embodiment, the processor 304 may apply different prioritization and limiting criteria than the processor 204 of the client device 104. The prioritized and limited results 578 are transmitted by the server 108 to the client device 104 as pre-selected results 408.

The client device 104 receives the pre-selected results 408 from the server 108 and the processor 204 next displays 528 the (limited) most relevant results 528 on the display screen 228 of the client device 104. In one embodiment, the processor 204 may instead or in addition present the results audibly through a speaker of the client device 104 to the user 116. The user 116 reviews the displayed results 528 and/or listens to the audio presentation of the results and may select one or more results 532. For example, the user 116 may tap on the display screen 228 to select one or more results 532 or provide a spoken selection 532 of audibly presented results.

The processor 204 stores the selected results as click-through data 536 to a memory of the client device 104. In one embodiment, the client device 104 may maintain click-through data for all previous queries since the client device 104 was activated. In another embodiment, the client device 104 may maintain click-through data in memory for only a predetermined number or time period of most recent previous queries. For example, the most recent 300 queries or queries within the previous month. In another embodiment, the processor 204 may automatically delete an oldest click-through result when the memory is full and a new click-through selected result 532 is being added. This may advantageously maintain the value of more recent click-through results without requiring a larger memory device to be purchased/installed.

In one embodiment, the client device 104 transmits the selected results 412 to the server 108. The server processor 304 then stores the selected results in the historical results database 562B. Thus, the historical results database 916 associated with the server 108 is updated by the selected results 412 from the most recent client device query 404.

Referring to FIG. 6A, a flow diagram for preparing data for client device queries 512 in accordance with embodiments of the present invention is shown. In one embodiment, the processor 204 of the client device 104 may limit the client device data with selection criteria 604. The selection criteria may include a distance range from the current client device 104 location, a time range, a date range, users 116 within a contact list, or certain categories (e.g., types of travel, retailer names, airline names, etc.). The selection criteria may be stored within configured parameters 708 of a client device 104 memory and retrieved from the memory as configured limits 712, as shown and explained in FIG. 7. The processor 204 may retrieve the configured limits 712 and apply the configured limits 712 to the client device data 504. This may eliminate one or more items of client device data 504 that fall outside the configured limits 712. For example, a configured limit 712 may refer to data items that occurred within the previous month. The processor 204 may have obtained a data item from the client device 104 that was scraped from a text message from 3 months ago. Because the text message falls outside the previous month configured limit 712, the text message may be deleted from the client device data 504 and not be incorporated in the query 516.

After limiting the client device data 604, the processor 204 of the client device 104 may in some cases perform one or more optional directed searches 608 based on the limited client device data 604. For example, limited client device data 604 may indicate an upcoming appointment at another location. The processor 204 may obtain traffic, construction, or weather updates to suggest changes in vehicle departure/arrival times. As another example, limited client device data 604 may include a text message from a friend that a new movie is showing tonight. The processor 204 may obtain show times for tonight from a local movie theatre the user 116 likes to visit. Unlike many conventional internet searches, directed searches 608 may be directed to specific requested information and do not result in pages of results to look through. The configured parameters 708 and configured limits 712 may be configured in a similar manner as explained in FIG. 17.

After performing any optional directed searches 608, the processor 204 may convert client device data to facts 612. The processor 204 converts client device data into facts 612 by determining the entity 458, the observation 462, and one or more objects 466 from each of the limited remaining data items (i.e. the limited client device data 604 perhaps enhanced with data from directed search(es) 608). The facts 454 follow the observation taxonomy (OT) described previously. Once the facts 454 have been assembled, the client device 104 is ready to query the historical click-through data in step 516 of FIG. 5A.

Referring to FIG. 6B, a flow diagram for preparing data for server queries 556 in accordance with embodiments of the present invention is shown. In one embodiment, the processor 204 of the client device 104 may limit the client device data with selection criteria 604. The selection criteria may include a distance range from the current client device 104 location, a time range, a date range, users 116 within a contact list, or certain categories (e.g., types of travel, retailer names, airline names, etc.). The selection criteria may be stored within configured parameters 708 of a client device 104 memory and retrieved from the memory as configured limits 712, as shown and explained in FIG. 7. The processor 204 may retrieve the configured limits 712 and apply the configured limits 712 to the client device data 504. This may eliminate one or more items of client device data 504 that fall outside the configured limits 712. For example, a configured limit 712 may refer to data items that occurred within the previous month. The processor 204 may have obtained a data item from the client device 104 that was scraped from a text message from 3 months ago. Because the text message falls outside the previous month configured limit 712, the text message may be deleted from the client device data 504 and not be incorporated in the query 566.

After limiting the client device data 604, the processor 204 of the client device 104 may in some cases perform one or more optional directed searches 608 based on the limited client device data 604. For example, limited client device data 604 may indicate an upcoming appointment at another location. The processor 204 may obtain traffic, construction, or weather updates to suggest changes in vehicle departure/arrival times. As another example, limited client device data 604 may include a text message from a friend that a new movie is showing tonight. The processor 204 may obtain show times for tonight from a local movie theatre the user 116 likes to visit. Unlike many conventional internet searches, directed searches 608 may be directed to specific requested information and do not result in pages of results to look through.

After performing any optional directed searches 608, the processor 204 may convert client device data to facts 612. The processor 204 converts client device data into facts 612 by determining the entity 458, the observation 462, and one or more objects 466 from each of the limited remaining data items (i.e. the limited client device data 604 perhaps enhanced with data from directed search(es) 608). The facts 454 follow the observation taxonomy (OT) described previously.

Once the facts 454 are all assembled, in one embodiment the processor 204 may order the facts by query stages 616. Query stages are shown and explained in FIG. 9A. The idea behind query stages is to begin with broader queries and apply successive queries to the results from a previous stage. For example, perform a stage 1 query on a relatively broad fact 454. From those query results, perform a stage 2 query that may be somewhat narrower than the stage 1 query. Then apply a stage 3 query to the stage 2 query results, and continue through any remaining stages. This will hopefully reduce the number of results greatly over multiple stages. There may be any number of query stages used in the server 108 but preferably the number of stages is low (5 or less) in order to save time to perform curated result finding. In another embodiment. the processor 204 may not order the facts by query stages 616 and instead present the facts 454 as inputs to neural net processing as shown in FIG. 9B.

In one embodiment, an optional step prior to performing fact 454 lookups in the historical results database 916 of the server 108 is to anonymize the facts 620. Anonymizing the facts 620 may include removing data that may directly associate a data item with the user 116 of the client device 104. Because the client device query 404 is transmitted through the network 112, it may be important to preserve the identity and privacy of the user 116 by removing the user's name, address, social security number, drivers license number, credit card information, etc. from the facts 454. However, anonymizing facts 620 may not be required since OT already removes sensitive and private information from facts 454.

A final step is to assemble the client device query from the facts 624. The flow at this point proceeds to step 566 of FIG. 5B to transmit the client device query 404 to the server 108.

Referring to FIG. 7, a block diagram illustrating client device pre-server actions 700 in accordance with embodiments of the present invention are shown. FIG. 7 illustrates software and hardware components of the client device 104 that contribute to query formation. The user 116 initially configures query limits as configured parameters 708 to a non-volatile memory device 208 of the client device 104. Typically, a GUI configuration utility is displayed on the display screen 228 of the client device 104, and the user 116 provides the configured parameters 708 (e.g., data, time, location ranges, etc. 704) through the GUI. The configuration process is explained in more detail with reference to FIG. 17. The user 116 may also configure 772 the query stages used by the server 108, as explained with reference to FIG. 9.

All queries are initiated when a user 116 activates a control 240A, 240B on the client device 104. The processor 204 performs many actions in response to that control activation 240, and the actions may be in a different order than shown. FIG. 7 is oriented to a client device query 404 transmitted to the server 108, but does not reflect actions taken in response to receiving the pre-selected results 408, or later items. In response to the control activation 240, the processor 204 may retrieve the configured limits 712 in order to limit the client device data with selection criteria 604.

The processor 204 may convert sensor 280 and application data 220, 224 to facts 454 based on the configured limits 716. For example, even though the user 116 may have received 20 SMS messages 216B since the last activation, the number of facts 454 may represent an arbitrary limit of 6 SMS messages 216B. The processor 204 may retrieve data and metadata from application usage data 724A, email data 212A, email metadata 216A, SMS message data 212B, SMS message metadata 216B, calendar/reminder data 212C, and $3^{rd}$ party applications 224. The application usage data 724A may produce selected application usage data 732, the email data 212A and email metadata 216A may produce email sweep text 736, the SMS message data 212B and SMS message metadata 216B may produce SMS sweep text 740, and the calendar/reminder data 212C may produce calendar/reminder sweep text 744. In some embodiments, a data/metadata request within configurable limits 716 may be provided to the historical click-through data 720A to produce previously selected results 728.

The processor 204 may also provide sensor data requests 748 to one or more on-device sensors 280 of the client device 104. For example, on-device sensors 280 may include a GPS receiver 244, a camera 252, a microphone 260, and an accelerometer 268. Other sensors 280 may also be used but are not specifically shown for clarity. The GPS receiver 244 may provide GPS coordinates 248, the camera 252 may produce camera images and video 256, the microphone 260 may produce audio 264, and the accelerometer 268 may produce movement data 272—all to one or more $3^{rd}$ party applications 224. The $3^{rd}$ party applications 224 also receive the data/metadata request within configured limits 716 and in response may produce social media preferences 776, audio text 756, image text 752, and a browser history 780. It may be advantageous to include text in queries 404 rather than images or actual audio in order to save network bandwidth and reduce transmission time. In general, client device queries 404 include metadata rather than data. However, in some embodiments, client device queries 404 may include one or more data items as well. For example, a client device query 404 may include a screenshot from the camera 252 along with analysis of the data in the form of one or more facts 454.

In most embodiments, the information provided in a client device query 404 may be limited by configured parameters 708 as discussed herein. For example, email sweep text 736 may be from only the previous 2 weeks, only the user's age and preferences may be provided with the user profile (not shown), browser history 780 may only be accepted from browsers A and B only and may not include financial websites, and so forth.

Using a package data to server function 760, the client device 104 creates facts 454 using the observation taxonomy (OT), assembles a client device query 404, and transfers the client device query 404 to the server 108. The query 404 may include on-device data 212 and metadata 216 and may make use of $3^{rd}$ party applications 224 on the client device 104 to obtain additional information. For example, a $3^{rd}$ party airline application may provide flight schedules or delays.

The package data to server function 760 may receive previously selected results 728, selected application usage data 732, email sweep text 736, SMS sweep text 740, calendar/reminder sweep text 744, social media preferences 776, audio text 756, image text 752, and browser history 780, process the data as facts 454, and transfer the facts 454 to the server 108 as a client device query 404. Processing the data may include filtering the data (i.e. limiting the data as previously described) 604, anonymizing the facts 620, and assembling the facts into a client device query 624, as previously described.

Referring to FIG. 8, a table illustrating client device query content 404 in accordance with embodiments of the present invention is shown. The client device query 404 may include a number of facts 454 that include content items 804. Each content item 804 may also reference a query stage to be used by the server 808. Query stages may have a value of '0' or 'none' if the fact is to be processed entirely without additional stages, or an integer value from '1' through a maximum query stage number.

Content items 804 may include, but are not limited to a user/client identity 810, a client device identity (MEI data) 812, a current data 814, a current time of day 816, a current location 818, a trajectory 820, configured limits 712, selected application usage data 732, calendar/reminder sweep text 744, email sweep text 736, SMS message sweep text 740, movement data 272, image text 752, audio text 756, previously selected results 728, social media preferences 776, browser history 780, a user profile 822, near-field communication (NFC) data 824, BLUETOOTH data 826, and/or any other forms available on the client device 104 either at the present time or in the future. In general, each client device query 404 may include at least time of day 816, the current location 818, and trajectory 820 (if available). The user profile 722 may include a user's age, sex, address, height, weight, hair/eye color, birth date, or other identifying information, and possibly preferences. Examples of preferences may include how a user prefers to receive information (text, audio, video, etc.), whether results should be provided for commercial and/or non-commercial results ((FIGS. 14-16), and events that have not happened yet but are scheduled for a future day.

In one embodiment, the content items 804, now expressed as OT facts 454, may be filtered 604 or made anonymous 620 before including in the client device query 404. Some items of query content 804 may include data that prior to transmission to the server 108 may contain items that uniquely identify an individual. For security purposes, those data items may be removed or anonymized prior to sending to the server 108. For example, a user's name, address, telephone number, email address, or family member's names may be included in user/client identity data 810 or a user profile 822. Sensitive data may also appear in other forms of data such as email sweep text 736 or SMS sweep text 740. The anonymize facts 620 function will remove or anonymize sensitive items before transmitting to the server 108. In one embodiment, where a server 108 is not able to be contacted and curated results are found strictly on the client device 104, there may not be a need to remove sensitive data from facts or anonymize the facts 620. In one embodiment, it may not be necessary to anonymize facts 620 because the conversion of raw unstructured data to structured OCL is specifically designed to not carry sensitive data.

Referring to FIG. 9A, a block diagram illustrating server processing actions for a client device query 900 in accordance with embodiments of the present invention are shown. The server 108 receives client device queries 404 from client devices 104 and provides pre-selected results 408 back to client devices 104. Each set of pre-selected results 408 may correspond to an individual client device query 404.

The server 108 initially unpackages data from the client device 904. Unpackaging the data may include separating each of the facts 454 in the client device query 404 and identifying the entity 458, observation 462, and object(s) 466 in each separated fact 454. The unpackaged data function 904 may present one or more unpackaged client device facts 928 to a query parser 912 function. There are many potential ways for the server 108 to obtain the pre-selected results 408 from the unpackaged client device facts 928. In the illustrated embodiment, the server 108 uses a multi-stage query to narrow down the facts 454 to a small number of specific results. Each fact 928 may include one or more content items 804 and an indicator that specifies a query stage to be used 808 by the server 108 for each content item 804. In one embodiment, each fact 928 may have an associated identifier assigned by the client device 104, and the content items 804 within each fact 928 may be linked by the common identifiers. For example, at the user's current location 818 (stage 1 query 932), social media preferences 776 (stage 2 query 936) may indicate that the user 116 often browses social media notifications at this location (i.e., checks social media often at the coffee shop).

The server 108 may include a query parser 912. The query parser 912 separates each unpackaged client device fact 928 into query stages as defined in the query stage used 808. In one embodiment, query stages may be hard coded for specific use cases, and/or may be a neural net. Any number of stages may be used although the illustrated embodiment shows four stages, identified as a stage 1 query 932, a stage 2 query 936, a stage 3 query 940, and a stage 4 query 944. The stage 1 query 932 occurs first and is presented to the historical results database 916. Next is the stage 2 query 936 (if present), followed by a stage 3 query 940 (if present), followed by a stage 4 query 944 (if present). Stage 1 results 948, stage 2 results 952, stage 3 results 956, and stage 4 results 960 are obtained from the historical results database 916 to a create a more determined best fit function 920. The operation of the create a more determined best fit function is described with reference to FIG. 10.

A staged query may be performed on content items 804 having a same identifier (not shown). For example, a fact 928 with a defined identifier may include a current location 818 and a query stage used 808 of "stage 1", SMS sweep text 740 and a query stage used 808 of "stage 2", a browser history 780 item and a query stage used 808 of "stage 3", and an audio text 756 item and a query stage used 808 of "stage 4". The server 108 may perform a repeated historical results database 916 lookup of the current location 818, followed by the SMS sweep text 740 on the stage 1 results 948, the browser history 780 item on the stage 2 results 952, and audio text 756 item on the stage 3 results 956. The resulting stage 4 results 960 will be presented to the create a more determined best fit 920 function. The create a more determined best fit 920 function may combine and then anonymize the stage 1-4 results 948, 952, 956, and 960 before including the combined results.

The create a more determined best fit function 920 may also receive results from a directed search and/or crowdsourced data 964. In one embodiment, the server 108 may be pre-configured with crowdsource website APIs. When the server 108 receives a fact 454 with a relevant barcode, the processor 304 queries the API for crowdsourced data 964. For example, one or more of the stage 1 948, stage 2 952, stage 3 956, or stage 4 960 results may require confirmation or more information from an internet website. For example, a fact 928 may indicate the user 116 has a flight scheduled for 6 PM that day. The server 108 may generate a directed search to the airline website to verify the scheduled flight time. Another fact 928 may indicate the user's trajectory 820 is toward a coffee shop that other users 116 (entries in the historical results database 916) have found to be highly rated. The server 108 may generate a directed search to the coffee shop website to find operating hours for today.

In one embodiment, the server 108 may filter results 968 from the create a more determined best fit 920 function prior to transferring pre-selected results 408 back to the requesting client device 104. Filtering the results 968 may include restricting the results to a predetermined number of results or pages of results.

Referring to FIG. 9B, a block diagram illustrating server processing actions for a client device query 970 in accordance with embodiments of the present invention are shown. The server 108 receives client device queries 404 from client devices 104 and provides pre-selected results 408 back to client devices 104. Each set of pre-selected results 408 may correspond to an individual client device query 404. FIG. 9B may represent a preferred structure for accessing the historical results database 916 and other data sources due to flexibility and efficiency in processing disparate data types.

The server 108 initially unpackages data from the client device 904. Unpackaging the data may include separating each of the facts 454 in the client device query 404 and identifying the entity 458, observation 462, and object(s) 466 in each separated fact 454. The unpackaged data function 904 may present one or more unpackaged client device facts 928 to a neural network 974.

Neural networks 974 are shown and described in many references and educational texts, including U.S. Pat. No. 11,288,575. Neural networks 974 are known in the art as being excellent at making heuristic decisions based on past patterns of highly variable input. In the present invention, relevant suggestions are made to a user 116 based on historically similar fact patterns to in device data 504 and feedback based on other users 116 interactions with client devices 104. In other words, when similar real-world stimulation to similar users 116 occurred, it is desired to predict what they are likely to choose. One challenge is that the facts 454 are many and have highly variable real-world values. As is well known in the art, neural networks 974 may be trained with historical data in order to predict a suitable response based on new inputs, even when those inputs are continuous and not discrete. The neural network query approach has advantages over traditional database queries, in that 'similarity' of facts 454 is difficult to quantify in advance. When presented with hundreds of facts 454, the variation in one fact 454, such as heading or velocity, might be highly important, or not important at all. In order to review these facts 454 to find excellent results with traditional queries would require special cases or something more complex. The neural network output may be Uniform Reference Identifiers (URIs), or references to server 108-internal database entries which are then converted to specific content to return to the user 116 in order of most-relevant first.

In one embodiment, the neural network 974 may be created on the server 108 through asynchronous training—relative to the client devices 104 and users 116—then downloaded into client devices 104 for offline work.

In one embodiment, users 116 may have one or more neural networks 974 that are unique or highly targeted to each specific user 116. In this case, as facts 454 are received from a client device 104, microservices may be instantiated with each specific user 116's neural network 974, so that when the activation is performed to initiate a query, the neural network 974 is ready to respond immediately.

The neural network 974 queries the historical results database 916 to determine what other users 116 have selected in the past and retrieves results 978. The neural network 974 may also receive directed search or crowdsourced data 964. In one embodiment, the server 108 may be pre-configured with crowdsource website APIs. When the server 108 receives a fact 454 with a relevant barcode, the processor 304 queries the API for crowdsourced data 964.

In one embodiment, the server 108 may filter results 968 from the neural network 974 prior to transferring pre-selected results 408 back to the requesting client device 104. Filtering the results 968 may include restricting the results to a predetermined number of results or pages of results.

Referring to FIG. 10, a flowchart illustrating a server more determined best fit process 920 in accordance with embodiments of the present invention is shown. The server more determined best fit process 920 is a process of recursive scanning (i.e., stages) to arrive at a manageable number of pre-selected results 408 to be sent to the client device 104 and presented to the user 116. Query stages were explained with respect to FIGS. 8 and 9, and also FIG. 17.

In some embodiments, only one query stage may be used (i.e., query stage used 808="none" or "1"). In other embodiments, multiple query stages may be used (i.e., query stage used 808="2" up to the maximum number of query stages present in the server 108). The process begins with de-anonymized client device facts 928. Each of the de-anonymized client device facts 928 may include one or more content items 804, and each content item 804 may have a corresponding query stage used 808.

The processor 304 of the server 108 begins with the content item 804 having an identified stage 1 query 932 (or a query stage used 808 designation of "none"). The processor 304 matches the stage 1 query to the historical results database 1004. This may produce "n" stage 1 results 948.

The processor 304 of the server 108 then initiates a query using a content item 804 having an identified stage 2 query 936 (if present). The processor 304 matches the stage 2 query to the stage 1 results 1008. This may produce "m" stage 2 results 952, where n>m.

The processor 304 of the server 108 then initiates a query using a content item 804 having an identified stage 3 query 940 (if present). The processor 304 matches the stage 3 query to the stage 2 results 1012. This may produce "o" stage 3 results 956, where m>o.

The processor 304 of the server 108 then initiates a query using a content item 804 having an identified stage 4 query 944 (if present). The processor 304 matches the stage 4 query to the stage 3 results 1016. This may produce "p" stage 4 results 960, where o>p. This recursive process continues until a last available stage has been reached or there are no more stages specified for the current de-anonymized client device fact 928.

Next, the processor 304 may determine that the final (948, 952, 956, 960) results contain information that may need to be verified. The processor 304 may generate requests for directed search(es) or crowdsourced data 1020. The requests may be generated to a search engine installed on the server 108. The server 108 may receive back directed search or crowdsourced data 1024, in response to the submitted request(s) 1020. The processor 304 combines the received directed search results or crowdsourced data 1028 with the last stage of results (948, 952, 956, 960). In one embodiment, the directed searches and/or the pre-selected results 408 may be cached in the server 108 and/or the client device 104. Thus, once cached, future directed searches may be a simple database 120 query instead.

Next, the processor 304 prioritizes the combined final stage results 1032. Each recursive and sequential query stage reduces the number of results. Ideally, this is a small number of results (not much more than 10-20). The processor 304 prioritizes the results by assigning a higher priority to results that are more timely (immediate over longer term), personal (affect the user 116 directly rather than others), and correlated with user preferences (previously selected results 728, social media preferences 776, and/or user profile 822). Once the results have been prioritized 1032, the processor 304 limits the number of results 1036. The limited number of results 1036 are the pre-selected results 408 transferred back to the client device 104. In one embodiment, the processor 304 may anonymize the pre-selected results 408 before sending the pre-selected results 408 back to the client device 104, if needed.

In one embodiment, the client device query 404 may specify a maximum number of results to limit the results 1036. In another embodiment, the client device 104 may set up or configure the server 108 with the maximum number of results desired by the user 116, the maximum number of query stages to use, etc.

Referring to FIG. 11, a block diagram illustrating client device post-server actions 1100 in accordance with embodiments of the present invention are shown. Post-server actions are actions performed by the client device 104 after receiving the pre-selected results 408 from the server 108.

The client device 104 unpackages data from the server 1104, which may include optional de-anonymizing results 1108 and filtering the data 1112. De-anonymizing the results 1108 may include adding back in data that may directly associate a data item with the user 116 of the client device 104, if needed. If the server 108 anonymized the pre-selected results 408 prior to transmitting through the network 112, the client device 104 may need to restore the identity of the user 116 And any other sensitive data items by adding back the user's name, address, social security number, drivers license number, etc. from the results. For example, the results may include placeholders such as "user name", "user drivers license number", or "user social security number" that may serve as instructions to the processor 204 of the client device 104 to add in the actual information.

Filtering the data 1112 may include reducing the number of pre-selected results 408, if the server 108 did not limit the number of results 1036 or if the number of pre-selected results 408 exceeds a desired number of results by the user 116 of the client device 104. For example, a more limited number of results may reflect a number of readable pre-selected results 408 that can be displayed on the display screen 228 and/or a number of pages on the display screen 228.

After unpackaging the data from the server 1104, the processor 204 receives filtered pre-selected results 1116. The processor 204 displays the filtered pre-selected results 1120 on the display screen 228. A user 116 associated with the client device 104 interacts with user interface controls (UI controls 232) to create selected results 412 from the displayed filtered pre-selected results 1120. The processor 204 stores the selected results as click-thru data 532 on the client device 104 in historical click-through data 720A in a memory 208 of the client device 104. The processor 204 may in some cases anonymize the selected results 412 and also transmits the (anonymized) selected results 412 to the server 108.

Referring to FIG. 12, a block diagram illustrating server post-query actions 1200 in accordance with embodiments of the present invention are shown. Server post-query actions are actions performed by the server 108 after receiving the selected results 412 from the client device 104.

The server 108 may unpackage data from the client device 1204. The processor 304 stores the selected results to the historical results database 562B.

Referring to FIG. 13, a diagram illustrating a historical results database 916 in accordance with embodiments of the present invention are shown. The historical results database 916 is stored on one or more servers 108 or in a database 120 accessible to one or more servers 108. An exemplary historical results database 916 may include various items of historical data 1304, a user ID 1308, a time of day 1312, a location 1316, a trajectory 1320, and a count of a number of times the items were returned 1324. The example of historical results database 916 shown in FIG. 13 shows eleven entries organized into four data patterns of historical data 1304: data pattern #1 1304A in the first five entries, data pattern #2 1304B in the next two entries, data pattern #3 1304C in the next three entries, and data pattern #4 1304D in the last entry. The historical data 1304 generally includes one or more entities, observations, or objects separate from a user ID 1308, time of day 1312, location 1316, and trajectory 1320. For example, historical data 1304 may include a business name, hours of operation, an item for sale, a description of a camera image, text from captured audio, a description of an activity or event, a website, and the like.

The historical results database 916 may include a user ID 1308 for each entry. The user ID 1308 may be based on a received user/client identity 810 within content items 804 in client device queries 404. In one embodiment, the user ID 1308 may be anonymized from a user's 116 actual name in order to protect a user's identity and improve security. In the illustrated example, the first and the eighth entries have a user ID User A 1308A, the second entry have a user ID User C 1308C, the first and the eighth entries have a user ID User A 1308A, the third and the ninth entries have a user ID User L 1308L, the fourth and the seventh entries have a user ID User M 1308M, the fifth entry has a user ID User Q 1308Q, the sixth and the eleventh entries have a user ID User B 1308B, and the tenth entry has a user ID User Z 1308Z.

The historical results database 916 may include a time of day 1312 for each entry. The time of day 1312 may be based on received time of day 816 within content items 804 in client device queries 404. In the illustrated example, the first, sixth, and eighth entries have a time of day a 1312A, the second entry has a time of day b 1312B, the third entry has a time of day d 1312D, the fourth and tenth entries have a time of day e 1312E, the fifth entry has a time of day f 1312F, the seventh entry has a time of day g 1312G, and the ninth and eleventh entries has a time of day h 1312H.

The historical results database 916 may include a location 1316 for each entry. The location 1316 may be based on received current location 818 within content items 804 in client device queries 404. In the illustrated example, the first and the sixth entries have a location i 1316A, the second entry has a location j 1316B, the third entry has a location k 1316C, the fourth and the seventh entries have a location l 1316D, the fifth entry has a location m 1316E, the eighth entry has a location o 1316F, the ninth entry has a location p 1316G, the tenth entry has a location q 1316H, and the eleventh entry has a location n 1316I.

The historical results database 916 may include a trajectory 1320 for each entry. The trajectory 1320 may be based on a received trajectory within content items 804 in client device queries 404. In the illustrated example, the first and the sixth entries have a trajectory s 1320A, the second and the seventh entries have a trajectory t 1320B, the fourth and the eighth entries have a trajectory u 1320C, and the eleventh entry has a trajectory v 1320F.

The historical results database 916 may include a count of a number of times each entry was returned 1324. The count of number of times a result was returned 1324 may reflect a popularity of an entry or a level of commonality with results other users 116 may have found useful (i.e. since based on selected results 412 from all users 116). In the illustrated example, the first entry was returned 17 times, the first entry was returned 17 times, the second, fifth, seventh, ninth, tenth, and eleventh entries was returned only 1 time, the third and the sixth entries were returned 2 times, the fourth entry was returned 8 times, and the eighth entry was returned 4 times. In one embodiment, the processor 304 may select the entry returned the most number of times 1324. In another embodiment, the processor 304 may select one or more entries that have been returned more than a threshold number of times (e.g., 10 times). In another embodiment, the processor 304 may select one or more entries that have been returned multiple of times (e.g., the first, third, fourth, sixth, and eighth entries).

For example, an initial match 1328 (corresponding to a stage 1 query 932) may be based on one or more of a time of day 1312, a location 1316, and/or a trajectory 1320. For example, a stage 1 query 932 based on a specific time of day 1312, location 1316, and trajectory 1320 may produce 10 matches in the historical results database 916. Of those 10 matches, three may include a same item of historical data 1304 (e.g., a same retail location or business name). In one embodiment, matched historical data 1304 may be used as the basis for a stage 2 query 1332. This may constitute a stage 2 query 1332 and may reduce the number of results from 10 to 3. Additional stage queries may reduce the number of results further.

For example, a stage query may include a user or client ID 810 and this may match a user ID 1336 in the historical results database 916. A subsequent stage query may include a current location 818 that matches a location 1340 in the historical results database 916. The result may include the historical data 1344 that corresponds to the matched user ID 1308 and location 1316.

For example, a stage query may include a user or client ID 810 and this may match a user ID 1336 in the historical results database 916. A subsequent stage query may include a current location 818 that does not match a location 1348 in the historical results database 916. In this case, the user ID 1308 may be weighted higher than other query elements.

For example, a stage query may include a user or client ID 810 and this may not match a user ID 1356 in the historical results database 916. A subsequent stage query may include a current location 818 that matches a location 1340 in the historical results database 916. In this case, the location 1316 may be weighted higher than other query elements.

In one embodiment, each time a client device query 404 is received, the unpackaged client device facts 928 and query stages (932, 936, 940, 944, etc.) may be obtained by the processor 304 of the server 108. If there is a match to an existing record in the historical results database 916 having a same user ID 1308, time of day 1312, location 1316, and trajectory 1320, the count of the number of times the item was returned 1324 is incremented. Otherwise, the processor 304 may add a new entry to the historical results database 916. The processor 304 recursively examines the historical results database 916 for matches as shown and described with respect to FIGS. 9 and 10. Other query analysis logic than that described herein or presented as examples may be used by the processor 304 without deviating from the scope of the present invention. In one embodiment, the processor 304 may remove entries from the historical results database 916. For examples, entries may be removed that are older than a predefined date or timeframe, a business or other entity no longer at a location, or entries that include incorrect data.

Referring to FIG. 14, a diagram illustrating a results presentation example 1400 in accordance with embodiments of the present invention are shown. A first example shown in FIG. 14 includes a commercial example of displayed filtered pre-selected results 1120 based on driving a vehicle in a commercial business area. A client device 104 is illustrated, displaying five results. Any number of results may be presented, subject to user preferences 708 and/or display screen 228 limitations on the client device 104. In one embodiment, the results may be presented in a priority order.

The first result 1404 states "Bad weather, nothing on calendar. There is a movie <X> you want to see at movie theater <Y> in 1 hour", where <X> denotes a movie name and <Y> denotes a movie theater name. This result 1404 may be based on a query or set of staged queries 1406 that may include "a good day for an indoor activity", social media preferences 776, and current movie information from a movie theater website (a directed search to a movie theater website to obtain show times and description information).

The second result 1408 states "Its 9 AM, <X> is back. Your <Y> balance is $10.25", where <X> denotes a name of a coffee drink and <Y> denotes a coffee shop name. This result 1408 may be based on a query or set of staged queries 1410 that may include a time of day 816, a history of purchasing coffee at this time 728, and a $3^{rd}$ party application for the coffee shop 780.

The third result 1412 states "You are near <X> location. Reminder for next haircut set for <Y>", where <X> denotes a haircut shop name and <Y> denotes a time from appointment data. This result 1412 may be based on a query or set of staged queries 1414 that may include emailed receipts 736, a history at the location 728, and not usual haircut timing yet 744.

The fourth result 1416 states "Song by <X> is playing now. Song is tagged in <Y>", where <X> denotes a musical performer name and <Y> denotes a music streaming service. This result 1416 may be based on a query or set of staged queries 1418 that may include the user is a frequent user of a music streaming service 732, social media preferences 776, and a song by a preferred artist is playing 756.

The fifth result 1420 states "You are 2 blocks from <X> and it is almost <Y>", where <X> denotes a restaurant name and <Y> denotes a habitual meal time such as lunch. This result 1420 may be based on a query or set of staged queries 1422 that may include a time of day 816, SMS message receipts 740, and a purchase pattern 822.

Referring to FIG. 15, a diagram illustrating a results presentation example 1500 in accordance with embodiments of the present invention are shown. A second example shown in FIG. 15 includes a non-commercial example of displayed filtered pre-selected results 1120, based on a visit to a park around mid-day. A client device 104 is illustrated, displaying five results. Any number of results may be presented, subject to user preferences 708 and/or display screen 228 limitations on the client device 104. In one embodiment, the results may be presented in a priority order.

The first result 1504 states "Welcome to <X>. A trail map and weather forecast is available at the <Y>", where <X> denotes a state park name and <Y> denotes a visitor center location. This result 1504 may be based on a query or set of staged queries 1506 that may include the current location 818, a trajectory of the client device approaching park trails 820, and trail map/weather forecast available from the park website (directed search to park website).

The second result 1508 states "It is close to lunchtime. A <X> and a <Y> are located ⅛ mile South of the park entrance", where <X> denotes a supermarket name and <Y> denotes a sandwich shop name. This result 1508 may be based on a query or set of staged queries 1510 that may include a time of day 816, a current location 818, and historical data including email and text receipts for lunch items at the current time of day 736, 740.

The third result 1512 states "Parking lots B and C at <X> are closed today for <Y>", where <X> denotes a state park name and <Y> denotes the parking lots are being resurfaced. This result 1512 may be based on a query or set of staged queries 1514 that may include weather (directed search to weather website or from an onboard weather application), the current location 818, a trajectory within the state park 820, and a parking advisory from the state park website (e.g., a directed search to the park web site).

The fourth result 1516 states "Please be careful around the reservoir in <X>. <Y>", where <X> denotes a state park name and <Y> denotes a warning that three drownings were reported at the reservoir in the past year. This result 1516 may be based on a query or set of staged queries 1518 that may include the time of day 816, the current location 818, and a historical frequency of the user accessing $3^{rd}$ party news applications at the current time and location 732.

The fifth result 1520 states "It might be time to take a break for <X>. It is <Y> outside now", where <X> denotes a walking activity and <Y> denotes an outside temperature. This result 1520 may be based on a query or set of staged queries 1522 that may include a time using a $3^{rd}$ party application is over an average time using that $3^{rd}$ party application 732, a pattern of the user taking a walk outside at this time of day 822, and weather at the user's current location (directed search to a weather website or from an onboard weather application).

Referring to FIG. 16, a diagram illustrating a results presentation example 1600 in accordance with embodiments of the present invention are shown. A third example shown in FIG. 16 includes a non-commercial example of displayed filtered pre-selected results 1120, based on a client device 104 is in a vehicle and unable to communicate with the server 108. A client device 104 is illustrated, displaying five results. Any number of results may be presented, subject to user preferences 708 and/or display screen 228 limitations on the client device 104. In one embodiment, the results may be presented in a priority order.

The first result 1604 states "You have less than <X> of vehicle range left. The next fuel station is <Y> ahead", where <X> denotes a remaining amount of vehicle range and <Y> denotes a distance to a next fuel station. This result 1604 may be based on a query or set of staged queries 1606 that may include the time of day 816, current location 818, unable to communicate with the server 812, BLUETOOTH data from the vehicle 826, and a BLUETOOTH navigation map from the vehicle 826.

The second result 1608 states "Your vehicle reports you are feeling drowsy now. Here is a turnout <X> miles ahead where you may safely pull over", where <X> denotes a travel distance to the turnout. This result 1608 may be based on a query or set of staged queries 1610 that may include the client device/vehicle trajectory 820, a current location 818, BLUETOOTH data from the vehicle 826, and a BLUETOOTH navigation map from the vehicle 826.

The third result 1612 states "<X> birthday is tomorrow. You have a long <Y> appointment at <Z>. Please call her before <Z>", where <X> denotes a friend or family member's name, <Y> denotes the type of appointment such as dental or auto maintenance, and <Z> denotes a time. This result 1612 may be based on a query or set of staged queries 1614 that may include calendar/appointment data 744 and a user profile 822.

The fourth result 1616 states "Your annual pass at the <X> expires on <Y>. Bring your wallet with you when you visit the <X> on <Z>", where <X> denotes a subscription location such as a recreation center, <Y> denotes an upcoming day or date, and <Z> denotes a day or date. This result 1616 may be based on a query or set of staged queries 1618 that may include the current location 818, NFC data 824, and historical renewal of an annual pass one year ago 744.

The fifth result 1620 states "You have not moved in the past <X> and audio has not been detected. A<Y> call will be initiated", where <X> denotes a time frame in minutes and <Y> denotes a type of call such as 911 emergency medical request. This result 1520 may be based on a query or set of staged queries 1622 that may include a time of day 816, a current location 818, movement data 272, audio text 756, and not answering two calls in the last 10 minutes 732.

Referring to FIG. 17, client device configuration 1700 in accordance with embodiments of the present invention is shown. A user 116 of a client device 104 may configure the client device 104 prior to use in order to optimize the curated results presentation to the user 116.

The user 116 may initially be presented configuration options on the client device display screen 228, typically as a graphical user interface (GUI) although other forms are possible. The user 116 may initially either configure a user profile 1704, or load an existing user profile 822 from another device or location. In some cases, configuring a user profile 1704 may occur as part of an initial setup of the client device 104 or prior to installation of a curated results finder application 224 on the client device 104. The user profile 822 may include many parameters associated with the user 116, including but not limited to the user's name, address, telephone number, email address, or family member's names, and the like.

The user 116 configures selection criteria for the data 1708. The selection criteria may include configured limits 712 that allow only certain results or result ranges to be presented to the user 116. For example, the selection criteria may specify date ranges, time of day ranges, person/company name ranges (i.e., only provide results for named individuals/companies and/or exclude named individuals/companies), location ranges (i.e. include only results for the client device 104 current location or a distance/radius from the current location, named locations, and/or exclude named locations), activity/event ranges (i.e., scheduled travel, appointments/meetings, birthdays, anniversaries, scheduled events—concerts, rallies, sporting events, parades, school activities, etc.). In one embodiment, the processor 204 may narrow selection criteria by reviewing historical click-through data 720A in a memory device of the client device 104 and limiting future presented results to ranges associated with the stored previous results 720A. In another embodiment, the client device 104 may obtain or receive configured limits 712 from a different client device 104 and adopt those as configured limits 712 for the client device 104. This may save time configuring the selection criteria for data 1708 by cloning a well-thought out configuration from a master client device 104. For example, a company may want company smart phones used by field personnel to be identically configured 1708 in order to present a consistent quality or content of curated results to users 116. For example, a company may only want results displayed related to the current day's appointments, customers, or business-related topics to users 116.

The user 116 next may configure a number of results or pages of results to display 1712 on the client device display screen 228. Some client devices 104 have smaller display screens 228 than other client devices 104, and some users 116 may not be able to comfortably view many results on a page with smaller displayed fonts. Additionally, some users 116 may want to limit results to only a single displayed page or a small number of results in order to limit results review time. The number of results or pages of results to display 1712 parameters may also include configuration parameters related to visually presenting results on the display screen 228 and/or audibly through a speaker of the client device 104, displayed colors, spoken volume, etc.

The user 116 next may configure common websites to perform directed lookups 1716. Common websites may be those that the user 116 frequently accesses to obtain specific data. For example, a commonly traveled airline site to obtain current flight information, a city or county transportation website to obtain bus or light rail travel schedules, retail location websites (grocery store, coffee shop, bank, church, dry cleaners, haircut/nails, restaurant, move theatre, etc.) to obtain hours of operation, sales, or coupons, and the like. By specifying the common websites and (more specifically) the URL of pages at the website where the specific information may be obtained, search time may be greatly reduced for any optional directed searches.

The user 116 next may configure query stages to be used for facts 1720. Query stages were described with reference to FIG. 9, and may represent one of many ways for the server 108 to obtain curated results from the client device query 404. Query stages are performed sequentially, with a second query stage following a first query stage, a third query stage following a second query stage, and so forth. Some facts may be analyzed independent of query stages, meaning that the fact in question is independently presented to the historical results database 916 without a subsequent lookup. These independent queries may be identified by a query stage of "none" in the query stage used 808 in FIG. 8. With the client device 104 fully configured as described herein, a rich and efficient curated results experience may be presented to the user 116.

In one embodiment, a method or computer program performing the method may include obtaining client device data 404 including a plurality of facts 454 from a client device 104, limiting the client device data 404 according to selection criteria 712, comparing the limited client device data to categorized historical data, determining one or more closest matches between the limited client device data and the categorized historical data, selecting, on the client device 104, content of interest from the one or more closest matches 412, and incorporating the content of interest into the categorized historical data. Each fact 454 may include an entity 458, an observation 462, and one or more objects 466.

In one embodiment, obtaining client device data may include detecting, by the client device 104, a control activation 240, and in response determining a current location of the client device 104, obtaining relevant data from one or more user device sensors 280, transforming sensor facts 454 from one or more sensors 280 of the client device 104, obtaining personal data facts 454 related to a user 116 associated with the client device 104, and transforming application facts 454 from one or more party applications 224 installed on the client device 104.

In one embodiment, transforming facts 454 may include interpreting data from sensors 280 or $3^{rd}$ party applications 224 to extract meaning or context, expressing the meaning or context in the form of an observation 462, and saving the observation 462 in a persistent store.

In one embodiment, limiting the client device data according to selection criteria 712 may include reviewing the entity 458, observation 462, and objects 466 for each fact 454 and one or more of eliminating facts 454 having an entity 458, observation 462, or object 466 that does not meet the selection criteria 712, and removing data from entities 458, observations 462, or objects 466 that uniquely identifies a user 116 associated with the client device 104. The selection criteria 712 may be based on one or more of a time range, a date range, a location range, and a client device application range.

In one embodiment, limiting the client device data according to selection criteria 712 may include reviewing the entity 458, observation 462, and objects 466 for each fact 454 and one or more of eliminating facts 454 having an entity 458, observation 462, or object 466 that does not meet the selection criteria 712, and replacing data from entities 458, observations 462, or objects 466 that uniquely identifies a user 116 associated with the client device 104 with data that does not uniquely identify the user 116. The selection criteria 712 may be based on one or more of a time range, a date range, a location range, and a client device application range.

In one embodiment, comparing the limited client device data to categorized historical data may include, for each non-eliminated fact 454, identifying a category that pertains to one or more of the entity 458, the observation 462, and the object 466, scanning the historical data for entries having a same category, and determining matches between one or more of an entity 458, an observation 462, and an object 466 and the categorized historical data.

In one embodiment, determining the one or more closest matches between the limited client device data and the categorized historical data may include organizing the matches by a number of common instances of an entity name 458, an observation 462, or an object 466 and limiting the number of matches to a predetermined number of matches having a highest number of common instances.

In one embodiment, selecting content of interest from the one or more closest matches may include displaying the one or more closest matches on a display 228 of the client device 104, indicating selection, by a user 116 associated with the client device 104, of one or more closest matches, and identifying the selected closest matches as content of interest.

In one embodiment, the categorized historical data may include selected content of interest from one or more of the client device 104 and other client devices associated with different users 116.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method, comprising:
   obtaining client device data comprising a plurality of facts from a client device, each fact comprising an entity, an observation, and an object;
   limiting the client device data according to selection criteria, comprising:
      reviewing the entity, observation, and object for each fact and one or more of:
         eliminating facts having an entity, observation, or object that does not meet the selection criteria, wherein the selection criteria is based on one or more of a time range, a date range, a location range, and a client device application range; and
         removing data from entities, observations, or objects that uniquely identifies a user associated with the client device;
   comparing the limited client device data to categorized historical data;
   determining one or more closest matches between the limited client device data and the categorized historical data;
   selecting, on the client device, content of interest from the one or more closest matches; and
   incorporating the content of interest into the categorized historical data.

2. The method of claim 1, wherein obtaining client device data comprises:
   detecting, by the client device, a control activation, and in response:
      determining a current location of the client device;
      obtaining relevant data from one or more user device sensors;
      transforming sensor facts from one or more sensors of the client device;
      obtaining personal data facts related to a user associated with the client device; and
      transforming application facts from one or more $3^{rd}$ party applications installed on the client device.

3. The method of claim 2, wherein transforming facts comprises:
   interpreting data from sensors or $3^{rd}$ party applications to extract meaning;

expressing the meaning in the form of an observation; and
saving the observation in a persistent store.

4. The method of claim 1, wherein comparing the limited client device data to categorized historical data comprises, for each non-eliminated fact:
identifying a category that pertains to one or more of the entity, the observation, and the object;
scanning the historical data for entries having a same category; and
determining matches between one or more of an entity, an observation, and an object and the categorized historical data.

5. The method of claim 1, wherein determining the one or more closest matches between the limited client device data and the categorized historical data comprises:
organizing the matches by a number of common instances of an entity name, an observation, or an object; and
limiting the number of matches to a predetermined number of matches having a highest number of common instances.

6. The method of claim 1, wherein selecting content of interest from the one or more closest matches comprises:
displaying the one or more closest matches on a display of the client device;
indicating selection, by a user associated with the client device, of one or more closest matches; and
identifying the selected closest matches as content of interest.

7. The method of claim 1, wherein the categorized historical data includes selected content of interest from one or more of the client device and other client devices associated with different users.

8. A computer program for instructing a computer to perform the method of:
obtaining client device data comprising a plurality of facts from a client device, each fact comprising an entity; an observation, and an object;
limiting the client device data according to selection criteria, comprising:
reviewing the entity, observation, and object for each fact and one or more of:
eliminating facts having an entity, observation, or object that does not meet the selection criteria, wherein the selection criteria is based on one or more of a time range, a date range, a location range, and a client device application range; and
removing data from entities, observations, or objects that uniquely identifies a user associated with the client device;
comparing the limited client device data to categorized historical data;
determining one or more closest matches between the limited client device data and the categorized historical data;
selecting, on the client device, content of interest from the one or more closest matches; and
incorporating the content of interest into the categorized historical data.

9. The computer program for instructing a computer to perform the method of claim 8, wherein obtaining client device data comprises:
detecting, by the client device, a control activation, and in response:
determining a current location of the client device;
obtaining relevant data from one or more user device sensors;
transforming sensor facts from one or more sensors of the client device;
obtaining personal data facts related to a user associated with the client device; and
transforming application facts from one or more $3^{rd}$ party applications installed on the client device.

10. The computer program for instructing a computer to perform the method of claim 9, wherein transforming facts comprises:
interpreting data from sensors or $3^{rd}$ party applications to extract meaning;
expressing the meaning in the form of an observation; and
saving the observation in a persistent store.

11. The computer program for instructing a computer to perform the method of claim 8, wherein comparing the limited client device data to categorized historical data comprises, for each non-eliminated fact:
identifying a category that pertains to one or more of the entity, the observation, and the object;
scanning the historical data for entries having a same category; and
determining matches between one or more of an entity, an observation, and an object and the categorized historical data.

12. The computer program for instructing a computer to perform the method of claim 8, wherein determining the one or more closest matches between the limited client device data and the categorized historical data comprises:
organizing the matches by a number of common instances of an entity name, an observation, or an object; and
limiting the number of matches to a predetermined number of matches having a highest number of common instances.

13. The computer program for instructing a computer to perform the method of claim 8, wherein selecting content of interest from the one or more closest matches comprises:
displaying the one or more closest matches on a display of the client device;
indicating selection, by a user associated with the client device, of one or more closest matches; and
identifying the selected closest matches as content of interest.

14. The computer program for instructing a computer to perform the method of claim 8, wherein the categorized historical data includes selected content of interest from one or more of the client device and other client devices associated with different users.

15. A system, comprising:
a processor; and
a memory, coupled to the processor, comprising instructions that when executed by the processor are configured to:
obtain client device data comprising a plurality of facts from a client device, each fact comprising an entity, an observation, and an object;
limit the client device data based on selection criteria, comprising the instructions are configured to:
review the entity, observation, and object for each fact and one or more of:
eliminate facts that have an entity, observation, or object that does not meet the selection criteria, wherein the selection criteria is based on one or more of a time range, a date range, a location range, and a client device application range; and
remove data from entities, observations, or objects that uniquely identifies a user associated with the client device;

compare the limited client device data to categorized historical data;
determine one or more closest matches between the limited client device data and the categorized historical data;
select, on the client device, content of interest from the one or ore closest matches; and
incorporate the content of interest the categorized historical data.

16. The system of claim 15, wherein the instructions are configured to obtain the client device data comprises the instructions are configured to:
   detect, by the client device, a control activation, and in response:
      determine a current location of the client device;
      obtain relevant data from one or more user device sensors;
      transform sensor facts from one or more sensors of the client device;
      obtain personal data facts related to a user associated with the client device; and
      transform application facts from one or more $3^{rd}$ party applications installed on the client device.

17. The system of claim 16, wherein the instructions are configured to transform facts comprises the instructions are configured to:
   interpret data from sensors or $3^{rd}$ party applications to extract a context;
   express the context in the form of an observation; and
   save the observation in a persistent store.

18. The system of claim 15, wherein the instructions are configured to compare the limited client device data to categorized historical data comprises, for each non-eliminated fact, the instructions are configured to:
   identify a category that pertains to one or more of the entity, the observation, and the object;
   scan the historical data for entries that have a same category; and
   determine matches between one or more of an entity, an observation, and an object and the categorized historical data.

19. The system of claim 15, wherein the instructions are configured to determine the one or more closest matches between the limited client device data and the categorized historical data comprises the instructions are configured to:
   organize the matches by a number of common instances of an entity name, an observation, or an object; and
   limit the number of matches to a predetermined number of matches that have a highest number of common instances.

20. The system of claim 15, wherein the instructions are configured to select content of interest from the one or more closest matches comprises the instructions are configured to:
   display the one or more closest matches on a display of the client device;
   indicate selection, by a user associated with the client device, of one or more closest matches; and
   identify the selected closest matches as content of interest.

21. The system of claim 15, wherein the categorized historical data includes selected content of interest from one or more of the client device and other client devices associated with different users.

* * * * *